US012658133B2

(12) United States Patent
Chung et al.

(10) Patent No.: US 12,658,133 B2
(45) Date of Patent: Jun. 16, 2026

(54) PIXEL AND DISPLAY APPARATUS INCLUDING THE SAME

(71) Applicant: Samsung Display Co., LTD., Yongin-si (KR)

(72) Inventors: Yunmo Chung, Yongin-si (KR); Ilhun Seo, Yongin-si (KR); Daewoo Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/053,624

(22) Filed: Feb. 14, 2025

(65) Prior Publication Data

US 2025/0363946 A1 Nov. 27, 2025

(30) Foreign Application Priority Data

May 14, 2024 (KR) ........................ 10-2024-0063413

(51) Int. Cl.
*H01L 33/38* (2010.01)
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2320/0233* (2013.01); *G09G 2320/0238* (2013.01); *G09G 2330/02* (2013.01)

(58) Field of Classification Search
CPC ......... G09G 3/3233; G09G 2300/0819; G09G 2300/0842; G09G 2320/0233; G09G 2320/0238; G09G 2330/02; G09G 3/3258; H10H 20/857; H10K 59/80516
See application file for complete search history.

(56) References Cited

U.S. PATENT DOCUMENTS

| | | | | |
|---|---|---|---|---|
| 11,145,700 | B2 | 10/2021 | Choi et al. | |
| 11,636,788 | B2 | 4/2023 | Kang et al. | |
| 2018/0006263 | A1* | 1/2018 | Yoon | H10K 59/80516 |
| 2019/0304368 | A1* | 10/2019 | Yang | G09G 3/3233 |
| 2020/0175925 | A1* | 6/2020 | Lee | G09G 3/3258 |
| 2022/0068727 | A1 | 3/2022 | Seo et al. | |
| 2022/0181521 | A1* | 6/2022 | Chu | H10H 20/857 |
| 2023/0042060 | A1* | 2/2023 | Wang | G09G 3/3258 |
| 2023/0267885 | A1 | 8/2023 | Cho et al. | |

FOREIGN PATENT DOCUMENTS

| | | | |
|---|---|---|---|
| KR | 1020210116793 | A | 9/2021 |
| KR | 1020220030393 | A | 3/2022 |
| KR | 1020230126294 | A | 8/2023 |

* cited by examiner

*Primary Examiner* — Abdul-Samad A Adediran
(74) *Attorney, Agent, or Firm* — CANTOR COLBURN LLP

(57) ABSTRACT

A pixel includes a tandem light-emitting element including a first light-emitting element and a second light-emitting element that are connected in series, a driving thin-film transistor electrically connected to the tandem light-emitting element, a storage capacitor electrically connected to a gate electrode of the driving thin-film transistor and the tandem light-emitting element, and an initialization thin-film transistor electrically connected to an electrode of the storage capacitor, an initialization voltage being applied to the electrode of the storage capacitor. The tandem light-emitting element emits light when a voltage equal to a turn-on voltage or more is supplied to the tandem light-emitting element.

17 Claims, 15 Drawing Sheets

PIXEL AND DISPLAY APPARATUS INCLUDING THE SAME

This application claims priority to Korean Patent Application No. 10-2024-0063413, filed on May 14, 2024, and all the benefits accruing therefrom under 35 U.S.C. § 119, the content of which in its entirety is herein incorporated by reference.

BACKGROUND

1. Field

Embodiments relate to a pixel and a display apparatus including the same, and more particularly, to a pixel with a reduced change in brightness of a light-emitting element caused by a current leakage phenomenon, and a display apparatus including the pixel.

2. Description of the Related Art

A display apparatus receives information regarding images and display images. A display apparatus is used as a display part of miniaturized products such as mobile phones and a display part of large-scale products such as televisions.

A display apparatus includes a plurality of pixels that receive electric signals and emit light to display images to the outside. Each pixel includes a light-emitting element. As an example, an organic light-emitting display apparatus includes an organic light-emitting diode ("OLED") as a light-emitting element. Generally, an organic light-emitting display apparatus includes a thin-film transistor and an organic light-emitting diode over a substrate, and operates while the organic light-emitting diode emits light spontaneously.

SUMMARY

The display apparatus may use tandem light-emitting elements. When a tandem light-emitting element is used, brightness may change when a tandem light-emitting element emits light due to an influence of a charge caused by a lateral leakage phenomenon.

Embodiments include a pixel with a reduced change in brightness of a light-emitting element caused by a current leakage phenomenon and a display apparatus including the pixel. However, such a technical feature is just an example, and the disclosure is not limited thereto.

Additional features will be set forth in part in the description which follows and, in part, will be apparent from the description, or may be learned by practice of the presented embodiments of the disclosure.

In an embodiment of the disclosure, a pixel includes a tandem light-emitting element including a first light-emitting element and a second light-emitting element that are connected in series, a driving thin-film transistor electrically connected to the tandem light-emitting element, a storage capacitor electrically connected to a gate electrode of the driving thin-film transistor and the tandem light-emitting element, and an initialization thin-film transistor electrically connected to an electrode of the storage capacitor. The tandem light-emitting element emits light when a voltage equal to a turn-on voltage or more is supplied to the tandem light-emitting element, an initialization voltage is applied to the electrode of the storage capacitor, the first light-emitting element emits light when a voltage equal to a first sub turn-on voltage or more is applied to the first light-emitting element, the second light-emitting element emits light when a voltage equal to a second sub turn-on voltage or more is applied to the second light-emitting element, and a magnitude of the initialization voltage is less than or equal to a magnitude obtained by subtracting the first sub turn-on voltage or the second sub turn-on voltage from the turn-on voltage.

In an embodiment, the magnitude of the initialization voltage may be greater than or equal to a magnitude of the first sub turn-on voltage.

In an embodiment, a magnitude of the first sub turn-on voltage may be equal to a magnitude of the second sub turn-on voltage.

In an embodiment, a driving voltage equal to the turn-on voltage or more may be applied to the tandem light-emitting element.

In an embodiment, a threshold compensation voltage may be transferred to the driving thin-film transistor through a compensation operation.

In an embodiment, a magnitude of the threshold compensation voltage may be less than a magnitude of a first sub power voltage.

In an embodiment, the tandem light-emitting element may further include a third light-emitting element connected in series to the second light-emitting element, where the third light-emitting element may emit light when a third sub turn-on voltage is supplied to the third light-emitting element.

In an embodiment, magnitudes of the first sub turn-on voltage, the second sub turn-on voltage, and the third sub turn-on voltage may be equal to each other.

In an embodiment, the tandem light-emitting element may further include a fourth light-emitting element connected in series to the third light-emitting element, where the fourth light-emitting element may emit light when a fourth sub turn-on voltage is supplied to the fourth light-emitting element.

In an embodiment of the disclosure, a pixel includes a tandem light-emitting element including a first light-emitting element and a second light-emitting element that are connected in series, a driving thin-film transistor electrically connected to the tandem light-emitting element and having a threshold voltage, a storage capacitor electrically connected to a gate electrode of the driving thin-film transistor and the tandem light-emitting element, and an initialization thin-film transistor electrically connected to an electrode of the storage capacitor, an initialization voltage being applied to the electrode of the storage capacitor. the tandem light-emitting element emits light when a voltage equal to a turn-on voltage or more is supplied to the tandem light-emitting element, a threshold compensation voltage that compensates for the threshold voltage is transferred to the driving thin-film transistor through a compensation operation, the first light-emitting element emits light when a voltage equal to a first sub turn-on voltage or more is applied to the first light-emitting element, the second light-emitting element emits light when a voltage equal to a second sub turn-on voltage or more is applied to the second light-emitting element, and a magnitude of the initialization voltage is less than or equal to a magnitude of the turn-on voltage.

In an embodiment, the magnitude of the initialization voltage may be equal to or greater than a magnitude of the first sub turn-on voltage.

In an embodiment, a magnitude of the threshold compensation voltage may be less than a magnitude of a first sub power voltage.

In an embodiment, a magnitude of the first sub turn-on voltage may be equal to a magnitude of the second sub turn-on voltage.

In an embodiment, a driving voltage equal to the turn-on voltage or more may be applied to the tandem light-emitting element.

In an embodiment, the tandem light-emitting element may further include a third light-emitting element connected in series to the second light-emitting element, where the third light-emitting element may emit light when a third sub turn-on voltage is supplied to the third light-emitting element.

In an embodiment, magnitudes of the first sub turn-on voltage, the second sub turn-on voltage, and the third sub turn-on voltage may be equal to each other.

In an embodiment, the tandem light-emitting element may further include a fourth light-emitting element connected in series to the third light-emitting element, where the fourth light-emitting element may emit light when a fourth sub turn-on voltage is supplied to the fourth light-emitting element.

In an embodiment, magnitudes of the first sub turn-on voltage, the second sub turn-on voltage, the third sub turn-on voltage, and the fourth sub turn-on voltage may be equal to each other.

In an embodiment of the disclosure, a display apparatus includes a display part in which a pixel connected to a data line and a gate line is arranged, the pixel including a tandem light-emitting element, a data driver which provides a data voltage to the pixel through the data line, a power supply part which provides a power voltage and an initialization voltage, and a controller which controls the data driver and the power supply part in response to control signals, where the tandem light-emitting element includes a first light-emitting element and a second light-emitting element that are connected in series. The tandem light-emitting element emits light when a voltage equal to a turn-on voltage or more is supplied to the tandem light-emitting element, and where the pixel includes a tandem light-emitting element including a first light-emitting element and a second light-emitting element that are connected in series, a driving thin-film transistor electrically connected to the tandem light-emitting element, a storage capacitor electrically connected to a gate electrode of the driving thin-film transistor and the tandem light-emitting element, and an initialization thin-film transistor electrically connected to an electrode of the storage capacitor, an initialization voltage being applied to the electrode of the storage capacitor. The tandem light-emitting element emits light when a voltage of a turn-on voltage or more is supplied to the tandem light-emitting element, the first light-emitting element emits light when a voltage equal to a first sub turn-on voltage or more is applied to the first light-emitting element, the second light-emitting element emits light when a voltage equal to a second sub turn-on voltage or more is applied to the second light-emitting element, and a magnitude of the initialization voltage is less than or equal to a magnitude obtained by subtracting the first sub turn-on voltage from the turn-on voltage.

In an embodiment, the magnitude of the initialization voltage may be equal to or greater than a magnitude of the first sub turn-on voltage.

In an embodiment, a threshold compensation voltage that compensates for a threshold voltage may be transferred to the driving thin-film transistor through a compensation operation, and a magnitude of the threshold compensation voltage may be less than a first sub power voltage.

BRIEF DESCRIPTION OF THE DRAWINGS

The above and other features and advantages of illustrative embodiments of the disclosure will be more apparent from the following description taken in conjunction with the accompanying drawings, in which.

DETAILED DESCRIPTION

Figure 1:
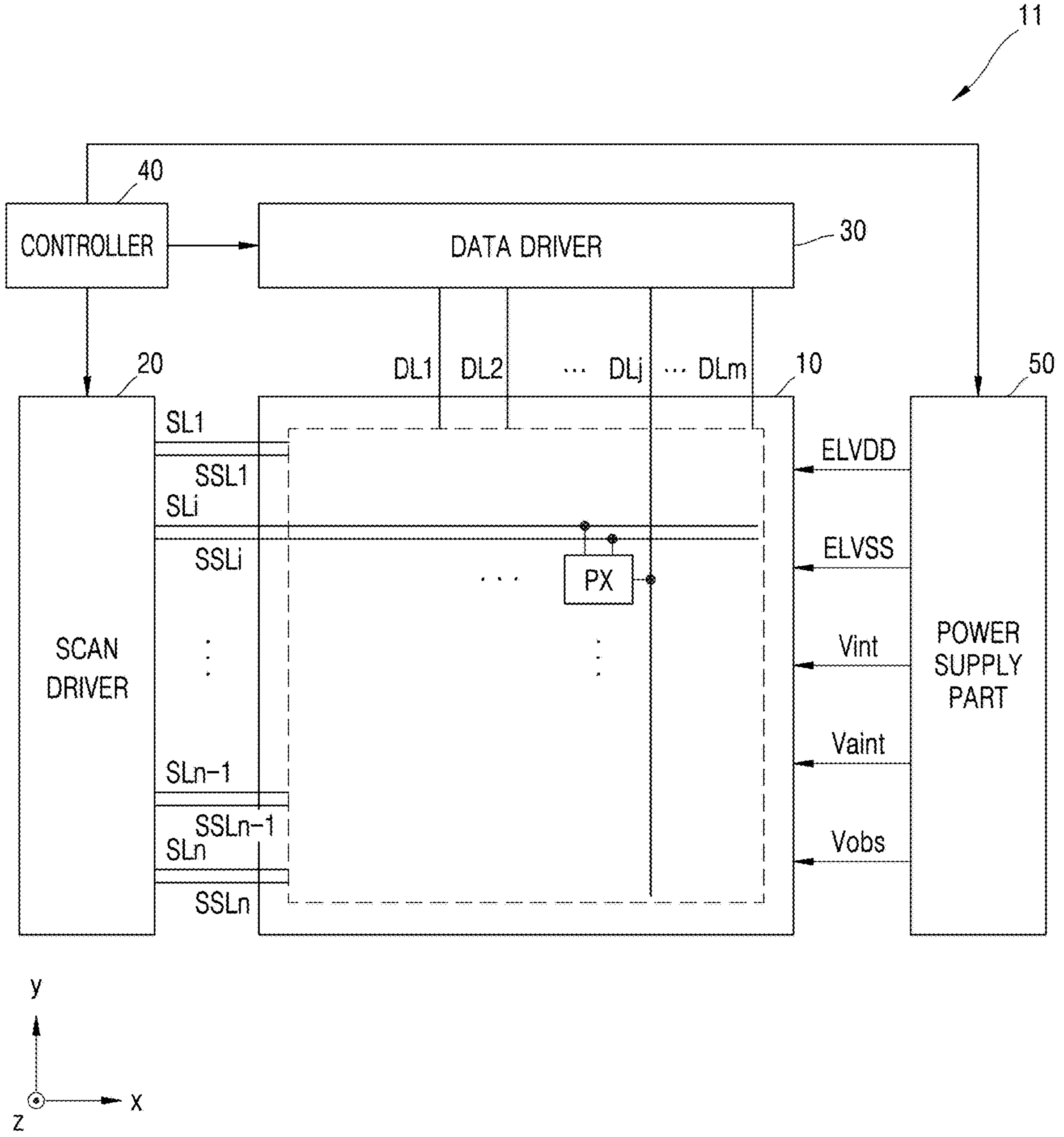
FIG. 1 is a schematic block diagram of a pixel and a display apparatus including the same.

Reference will now be made in detail to embodiments, illustrative embodiments of which are illustrated in the accompanying drawings, where like reference numerals refer to like elements throughout. In this regard, the illustrated embodiments may have different forms and should not be construed as being limited to the descriptions set forth herein. Accordingly, the embodiments are merely described below, by referring to the drawing figures, to explain features of the description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, illustrative embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described with reference to the accompanying drawings, where like reference numerals refer to like elements throughout and a repeated description thereof is omitted.

As used herein, when various elements such as a layer, a region, a plate, and the like are disposed "on" another element, not only the elements may be disposed "directly on" the other element, but another element may be disposed therebetween. As used herein, when various elements such as a layer, a region, a plate, and the like are disposed "under" another element, not only the elements may be disposed "directly under" the other element, but another element may be disposed therebetween.

In addition, sizes of elements in the drawings may be exaggerated or reduced for convenience of explanation. As an example, the size and thickness of each element shown in the drawings are arbitrarily represented for convenience of description, and thus, the disclosure is not necessarily limited thereto. That is, for convenience of description, the size, thickness and proportions of elements shown in the drawings may be exaggerated and/or simplified for clarity. Therefore, spatially relative terms such as "below", "lower", "lower", "lower", "above", "upper", and the like may be terms used herein to easily describe the relationship of one element or feature.

Terms used to describe space, direction, and the like in this specification are terms for describing the space and direction shown in the drawings, but may be understood as terms for describing various other directions or various viewpoints. As an example, in the case an apparatus or element shown in the drawing is turned over, the apparatus or element described "below" may be interpreted in a different orientation (e.g., rotated 90 degrees, in the opposite direction, and the like). As an example, in the case an apparatus or element shown in the drawing is turned over, the apparatus or element described "on" may be interpreted in a different orientation (e.g., rotated 90 degrees, in the opposite direction, and the like). Accordingly, "below" and "on" may include both upward and downward directions. In addition, an apparatus or element may be oriented differently from the drawings, and descriptions of a space or direction described herein may be interpreted in various ways.

The order of processes or the order of methods understood in the description of processing processes, manufacturing methods, and the like in this specification may be different from the described order. For example, two consecutively described processes or methods may be performed at the same time or substantially at the same time, or performed in an order opposite to the described order.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different orientations that are not perpendicular to one another.

The terms "first," "second," "third" and the like may be used herein to describe specific elements. The terms "first," "second," "third" and the like may be used to distinguish one element from another.

When an element is referred to as being "connected to" or "coupled to" another element, it is understood that the element may be connected or coupled to the other element directly or indirectly.

Likewise, when one element is referred to as being "electrically" connected to another element, one element may be directly and electrically connected to the other element, or directly and electrically connected to the other element through a conductive element.

In addition, when an element is referred to as being "between" two elements, it may be understood that one element is only one element disposed between the two elements, or another element other than the one element is disposed between the two element.

The terms used in this specification are used to describe illustrative embodiments and are not intended to limit the disclosure. As used herein, the singular forms "a," "an" and "the" are intended to include the plural forms as well, unless the context clearly indicates otherwise.

It will be understood that the expressions "mix", "mixture", "comprises" and "comprising" used herein specify the presence of stated features, integers, operations, factors and/or elements, but do not preclude the presence or addition of one or more other features, integers, operations, factors and/or elements.

For example, the term "and/or" includes any and all combinations of one or more of the associated listed items. For example, "A and/or B" means A or B, or A and B. Expressions such as "at least one" may be used to refer to one or more elements among a plurality of elements. For example, the expressions "at least one of a, b, and c" and "at least one selected from the group consisting of a, b, and c" are "a", "b", "c", "a, b", "b, c", "a, c" or "a, b, c".

For example, terms such as "substantially," "approximately," and similar terms are used as terms of approximation rather than terms of degree, and may be terms to describe inherent variations in measured or calculated values that would be recognized by a person of ordinary skill in the art. For example, use of terms such as "can," "may," and the like may be used to mean "embodiments disclosed herein".

For example, in this specification, when one layer is referred to as having the "same layer structure" as another layer may mean that a plurality of layers included in one layer may be included in the same order in another layer. For example, a plurality of layers included in one layer and a plurality of layers included in another layer may each include the same material and be formed in the same order.

Electronic or electrical devices and/or any other related devices, parts (e.g., a display part or a power supply part) or components (e.g., some of the various modules) in embodiments of the disclosure described herein may be configured with any suitable hardware such as a circuitry, firmware (e.g., it may be implemented using a combination of application-specific integrated circuits), software, firmware, and hardware. For example, the various components (or parts) of these devices may be formed on one integrated circuit ("IC") chip or on separate IC chips. Moreover, the various components of these devices may be formed on a flexible printed circuit film, a tape carrier package ("TCP"), a printed circuit board ("PCB"), or on a single substrate. Additionally, the various components of these devices may be processes or threads, run on one or more processors, execute computer program instructions on one or more computing devices, and interact with other system components to perform various functions described herein.

Computer program instructions are stored in memory that may be implemented in a computing device using standard memory devices, such as random access memory ("RAM"). Computer program instructions may also be stored on other non-transitory computer-readable media, such as, e.g., a compact disc read-only memory ("CD-ROM"), flash drive, or the like. Additionally, one of ordinary skilled in the art will recognize that the functionality of various computing devices may be combined or integrated into a single computing device, or that the functionality of a particular computing device may be dispersed across one or more other computing devices without departing from the spirit and scope of the embodiments of the disclosure.

Hereinafter, a pixel and a display apparatus including the same in an embodiment are described in detail based on the above descriptions.

FIG. 1 is a schematic block diagram of a pixel and a display apparatus 11 including the same.

As shown in FIG. 1, the display apparatus 11 may include a display part 10 (e.g., a display panel or the like), a scan driver 20 (e.g., a scan driver or the like), a data driver 30 (e.g., a data driver or the like), a controller 40 (e.g., a timing controller or the like), and a power supply part 50 (e.g., a power supply or the like). The scan driver 20, the data driver 30, the controller 40, and the power supply part 50 may be respectively formed in separate semiconductor chips or integrated in one semiconductor chip. In addition, the scan driver 20 and/or the data driver 30 may be formed on the same substrate as the display part 10. The display apparatus 11 may be a part for displaying images in electronic apparatuses such as smartphones, tablet personal computers ("PCs"), notebook PCs, monitors, televisions ("TVs"), or the like.

A plurality of pixels PX may be disposed in the display part 10. The plurality of pixels PX is connected to a plurality of control lines SL1 to SLn extending in a first direction (e.g., an x direction) and a plurality of data lines DL1 to DLm extending in a second direction (e.g., a y direction). Here, n and m are natural numbers. In an embodiment, the plurality of pixels PX may be also connected to sensing scan lines SSL1 to SSLn.

For convenience of description, although the control lines SL1 to SLn are shown as one signal line, each of the control lines SL1 to SLn may include a plurality of signal lines. In an embodiment, the first control line SL1 may include three lines which apply a scan signal, an initialization control signal, and an emission control signal, respectively.

A unit pixel may include a plurality of sub-pixels which respectively display a plurality of colors to display various colors. In the specification, the pixel PX mainly denotes one sub-pixel. That is, in the specification, when one pixel PX is described as being present, it may be interpreted that one sub-pixel is present.

The scan driver 20 may provide a plurality of control signals to the pixels PX through the control lines SL1 to SLn, and the data driver 30 may provide data signals to the pixels PX through the data lines DL1 to DLm.

The controller 40 may control the scan driver 20, the data driver 30, and the power supply part 50. The controller 40 may output control signals for controlling the scan driver 20, the data driver 30, and/or the power supply part 50, and image data to the scan driver 20, the data driver 30, and/or the power supply part 50 based on a horizontal synchronization signal and a vertical synchronization signal. The power supply part 50 may apply a driving voltage ELVDD, a common voltage ELVSS, a first initialization voltage Vint, a second initialization voltage Vaint, and a bias voltage Vobs to the pixels PX.

The pixel PX may include a light-emitting element and a pixel circuit separably connected to the light-emitting element. In an embodiment, the pixel circuit may include an internal compensation circuit described below. In an embodiment, the light-emitting element emits light of a brightness corresponding to a data signal.

In an embodiment, the display apparatus may include the display part, the data driver, the power supply part, and the controller. The pixel connected to the data line and the gate line is disposed in the display part and may include a tandem light-emitting element. The data driver may provide a data voltage to the pixel through the datal line, and the power supply part may provide a power voltage and an initialization voltage to the pixel. The controller may control the data driver and the power supply part using control signals. In this case, the tandem light-emitting element described below may include a first light-emitting element and a second light-emitting element connected in series, and emit light when a voltage of a turn-on voltage or more is supplied thereto.

Figure 2:
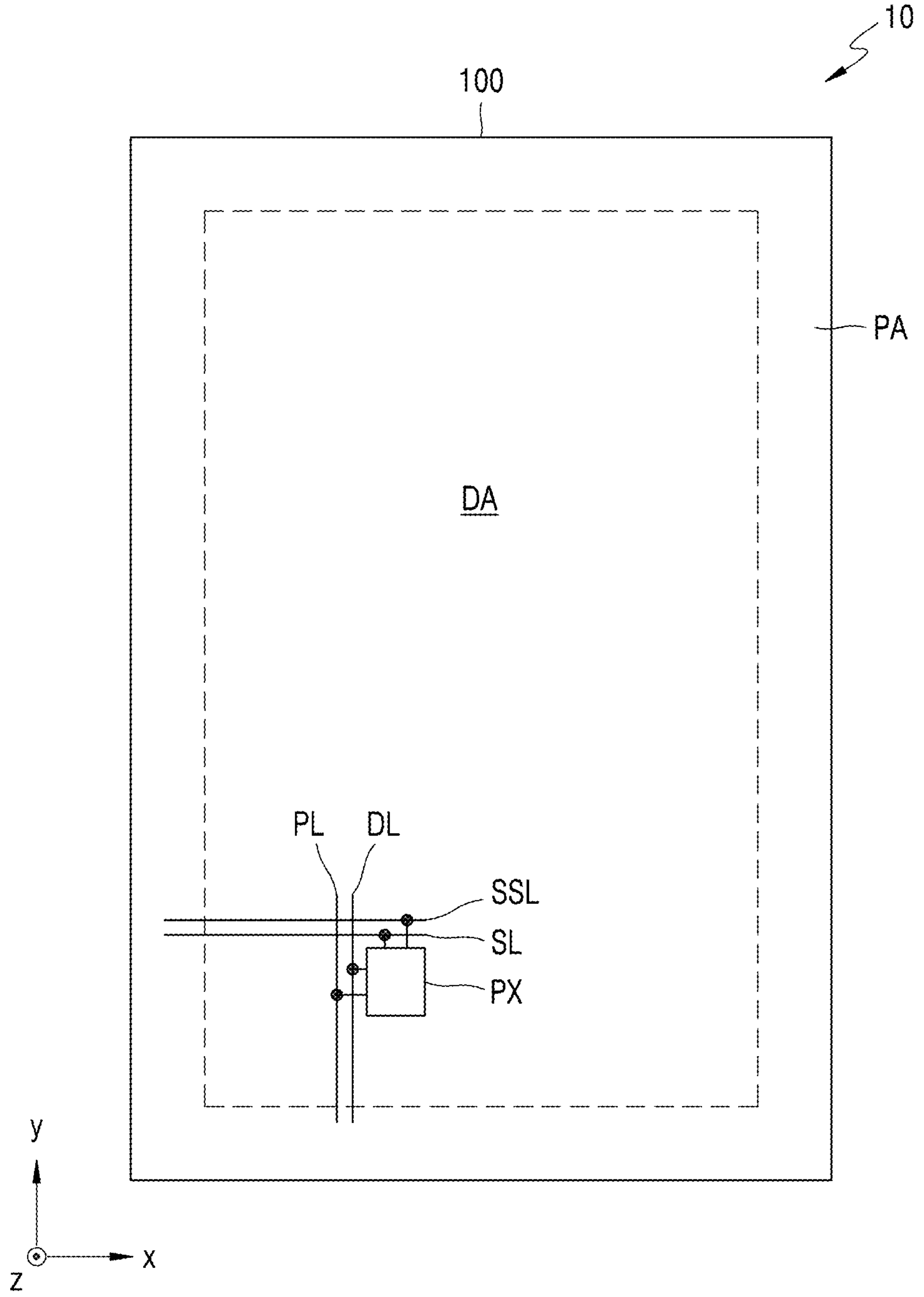
FIG. 2 is a schematic plan view of a pixel and a display apparatus including the same.

FIG. 2 is a schematic plan view of a pixel and the display apparatus 11 including the same.

As shown in FIG. 2, the display apparatus in an embodiment may include the display part 10. As long as the display apparatus includes the display part 10, any display apparatus may be used. In an embodiment, the display apparatus may include various apparatuses such as smartphones, tablet computers, laptop computers, televisions, advertisement boards, or the like. Because the display apparatus in an embodiment includes thin-film transistors, a capacitor, or the like, the thin-film transistors, the capacitor, or the like may be implemented by conductive layers and insulating layers.

The display part 10 includes a display area DA and a peripheral area PA outside the display area DA. Although it is shown in FIG. 1 that the display area DA has a quadrangular shape, e.g., rectangular shape, the disclosure is not limited thereto. The display area DA may have various shapes, e.g., circular shapes, elliptical shapes, polygonal shapes, or shapes of predetermined drawing figures.

The display area DA is a region in which images are displayed, and the plurality of pixels PX may be disposed in the display area DA. Each pixel PX may include a display element such as an organic light-emitting element. Each pixel PX may emit, e.g., red, green, or blue light. The pixel PX may be connected to a pixel circuit including a thin-film transistor TFT, a storage capacitor, or the like.

The pixel circuit may be connected to a control line SL, a data line DL, and a driving voltage line PL. The control line SL transfers scan signals, the data line DL crosses the control line SL and transfers data signals, and the driving voltage line PL supplies a driving voltage. The data line DL and the driving voltage line PL may extend in a y axis direction (also referred to as a second direction, hereinafter), and the control line SL may extend in an x axis direction (also referred to as a first direction, hereinafter).

The pixel PX may emit light of a brightness corresponding to an electrical signal from the pixel circuit electrically connected thereto. The display area DA may display preset images by light emitted from the pixel PX. For reference, the pixel PX is a sub-pixel, and the sub-pixel may be defined as an emission area that emits light having one of red, green, and blue.

The peripheral area PA is a region in which pixels PX are not disposed and may be a region that is configured not to display images. The driving voltage line PL for driving the pixel PX or the like may be disposed in the peripheral area PA. In addition, pads may be arranged in the peripheral area PA. A printed circuit board including the controller 40, an integrated circuit element such as a driver IC and pads may be electrically connected to each other in the peripheral area PA.

For reference, because the display part 10 includes a substrate 100, it may be understood that the substrate 100 includes the display area DA and the peripheral area PA. The substrate 100 is described below in detail.

In addition, a plurality of transistors may be arranged in the display area DA. In the plurality of transistors, a first terminal of a transistor may be a source electrode or a drain electrode, and a second terminal may be a different electrode from the first terminal depending on the kind (an N-type or P-type) and/or an operation condition of the transistor. In an embodiment, in the case where the first terminal is a source electrode, the second terminal may be a drain electrode.

In an embodiment, the plurality of transistors may include a driving thin-film transistor, a data-write transistor, a compensation transistor, an initialization transistor, an emission control transistor, or the like. The driving thin-film transistor may be connected between the driving voltage line PL and the organic light-emitting element, and the data-write transistor may be connected to the data line DL and the driving thin-film transistor, and may perform a switching operation of transferring a data signal received through the data line DL.

The compensation transistor may be turned on according to a scan signal transferred through the control line SL and may compensate for a threshold voltage of the driving thin-film transistor by connecting the driving thin-film transistor to the organic light-emitting element.

The initialization thin-film transistor may be turned on according to a scan signal transferred through another control line (e.g., a sensing scan line SSL of FIG. 3) and initialize a gate electrode of the driving thin-film transistor by transferring an initialization voltage to the gate electrode of the driving thin-film transistor.

The emission control transistor may be turned on according to an emission control signal transferred through an emission control line, and as a result, a driving current may flow through the organic light-emitting element.

The organic light-emitting element may include a pixel electrode (an anode) and an opposite electrode (a cathode) and receive a desired voltage from the pixel electrode (the anode) and the opposite electrode (the cathode). The organic light-emitting element may display images by receiving the driving current and emitting light.

Hereinafter, although an organic light-emitting display apparatus is described in an embodiment of the display apparatus in an embodiment, the display apparatus is not limited thereto. In another embodiment, the display apparatus in an embodiment may be an inorganic light-emitting display apparatus or a quantum-dot light-emitting display apparatus. Preferably, the display apparatus according to the disclosure may include a tandem light-emitting element TD that uses organic light-emitting elements.

Figure 3:
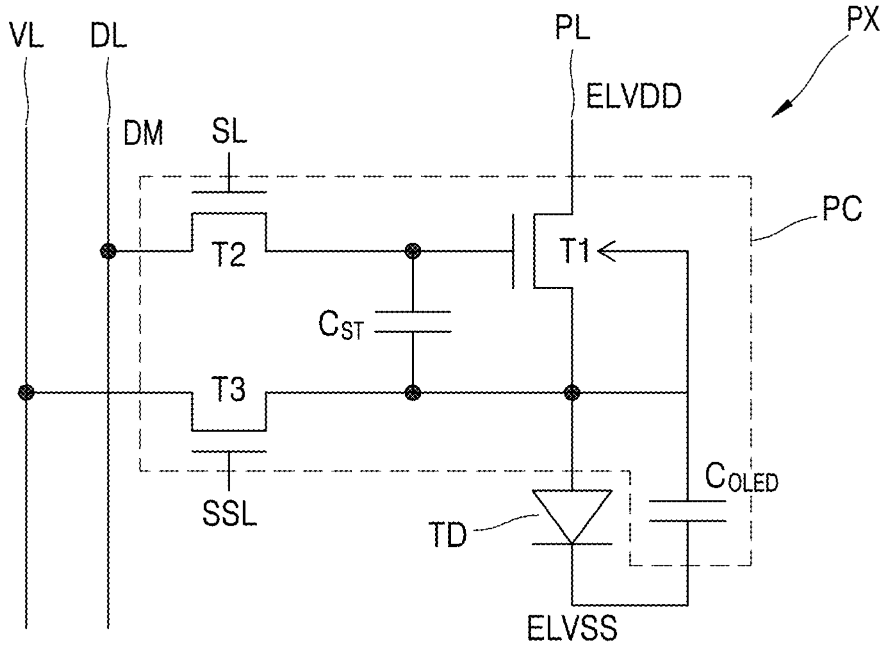
FIG. 3 is a schematic equivalent circuit diagram of the pixel of the display apparatus of FIG. 1.

FIG. 3 is a schematic equivalent circuit diagram of a pixel of the display apparatus 11 of FIG. 1.

Referring to FIG. 3, each pixel PX includes a pixel circuit PC and the tandem light-emitting element TD connected to the pixel circuit PC. The pixel circuit PC is connected to the scan line SL and the data line DL. For convenience of description, only some of the thin-film transistors may be shown in the pixel circuit PC of FIG. 3.

In an embodiment, the pixel circuit PC includes a driving thin-film transistor T1, a switching thin-film transistor T2, and a storage capacitor Cst.

In an embodiment, the driving thin-film transistor T1 may be connected to the driving voltage line PL and the storage capacitor Cst and may control the driving current according to the voltage stored in the storage capacitor Cst, the driving current flowing from the driving voltage line PL to the tandem light-emitting element TD. The tandem light-emitting element TD may emit light having a preset brightness corresponding to the driving current. In an embodiment, the gate electrode of the driving thin-film transistor T1 may be electrically connected to one of electrodes of the storage capacitor, and simultaneously, electrically connected to a drain electrode of the switching thin-film transistor T2.

In an embodiment, the switching thin-film transistor T2 is connected to the data line DL, and transfers a data signal Dm to the driving thin-film transistor T1 according to a scan signal. The data signal Dm is input through the data line DL, and the scan signal is input through the control line SL.

An initialization thin-film transistor T3 may include a gate electrode, a drain electrode, and a source electrode. The gate electrode is connected to the sensing scan line SSL, the drain electrode is connected to the driving thin-film transistor T1 and the storage capacitor Cst, and the source electrode is connected to an initialization voltage line VL. In an embodiment, an initialization voltage may be transferred to the initialization thin-film transistor T3 through the initialization voltage line VL.

Depending on the case, the initialization thin-film transistor T3 may be a sensing thin-film transistor. In this case, the initialization voltage line VL may transfer sensing data. In an alternative embodiment, unlike FIG. 3, a separate sensing thin-film transistor may be additionally provided to the pixel circuit PC.

In an embodiment, the storage capacitor Cst is connected to the drain electrode of the switching thin-film transistor T2 and the gate electrode of the driving thin-film transistor T1 and may store a voltage corresponding to a difference between a voltage transferred from the switching thin-film transistor T2 and the initialization voltage supplied to the initialization thin-film transistor T3. One electrode of the storage capacitor Cst may be electrically connected to the initialization thin-film transistor T3, and another electrode of the storage capacitor Cst may be electrically connected to the switching thin-film transistor T2 and the driving thin-film transistor T1.

The initialization thin-film transistor T3 may transfer a threshold compensation voltage to the driving thin-film transistor T1 through a compensation operation. The initialization thin-film transistor T3 may transfer the threshold compensation voltage to the driving thin-film transistor T1 in response to a control signal of the sensing scan line SSL through the compensation operation. In an embodiment, to perform the compensation operation, the display apparatus 11 in an embodiment may further include a separate internal compensation circuit (not shown). The controller 40 may perform the compensation operation by controlling operation timings of the driving thin-film transistor T1, the switching thin-film transistor T2, and the initialization thin-film transistor T3, the internal compensation circuit (not shown), or the like, and the compensation operation may mean operations of elements performed for compensating for the threshold voltage of the driving thin-film transistor T1, and the known art may be used.

The tandem light-emitting element TD may receive a first power voltage ELVDD (or the driving voltage) and a second power voltage ELVSS (or the common voltage). In an embodiment, the tandem light-emitting element TD may receive the second power voltage ELVSS (or the common voltage) through the opposite electrode (the cathode) and receive the first power voltage ELVDD (or the driving voltage) through the pixel electrode (the anode). The tandem light-emitting element TD may emit light having a preset brightness based on the driving current corresponding to a voltage difference between the first power voltage ELVDD (or the driving voltage) and the second power voltage ELVSS (or the common voltage).

A diode capacitor Coled may be a parasitic capacitor formed in the tandem light-emitting element TD. When the first initialization voltage Vint is supplied to the anode electrode of the tandem light-emitting element TD, the diode capacitor Coled of the parasitic capacitor of the tandem light-emitting element TD is discharged, and when the diode capacitor Coled is discharged, black expression ability of the pixel PX is improved.

Although it is described with reference to FIG. 3 that the pixel circuit PC includes three thin-film transistors and two storage capacitors, the disclosure is not limited thereto. In an embodiment, the pixel circuit PC may not only include two or more storage capacitors but also include four or more thin-film transistors.

In an embodiment, the pixel may include the tandem light-emitting element TD, the driving thin-film transistor T1, the storage capacitor Cst, and the initialization thin-film transistor T3.

As described below with reference to FIGS. 5 to 11 or the like, the tandem light-emitting element TD may include light-emitting elements connected in series. In an embodiment, the tandem light-emitting element TD may include a first light-emitting element and a second light-emitting element connected in series. The tandem light-emitting element TD may further include other light-emitting elements. The tandem light-emitting element TD may emit light when a voltage of a turn-on voltage or more is supplied thereto.

The driving thin-film transistor T1 may be electrically connected to the tandem light-emitting element TD. The source electrode of the driving thin-film transistor T1 may be electrically connected to the driving voltage line PL, the drain electrode of the driving thin-film transistor T1 may be electrically connected to the tandem light-emitting element TD, and the gate electrode of the driving thin-film transistor T1 may be electrically connected to the storage capacitor Cst and the drain electrode of the switching thin-film transistor T2.

The storage capacitor Cst may be electrically connected to the gate electrode of the driving thin-film transistor T1 and the tandem light-emitting element TD. In an embodiment, the storage capacitor Cst may include two electrodes. One electrode of the storage capacitor Cst may be electrically connected to the initialization thin-film transistor T3 and the drain electrode of the driving thin-film transistor T1, and the other electrode of the storage capacitor Cst may be electrically connected to the gate electrode of the driving thin-film transistor T1 and the drain electrode of the switching thin-film transistor T2.

The gate electrode of the switching thin-film transistor T2 may be electrically connected to the control line SL, the source electrode of the switching thin-film transistor T2 may be electrically connected to the data line DL, and the drain electrode of the switching thin-film transistor T2 may be electrically connected to the other electrode of the storage capacitor Cst and the gate electrode of the driving thin-film transistor T1.

In an embodiment, the first light-emitting element may emit light when a voltage of a first sub turn-on voltage or more is supplied thereto, and the second light-emitting element may emit light when a voltage of a second sub turn-on voltage or more is supplied thereto.

In an embodiment, the magnitude of the initialization voltage may satisfy the range of Equation below.

$$V_{turn\ on\ 1EL\ tandem} \leq Vint \leq V_{turn\ on} - V_{turn\ on\ 1EL\ tandem} \quad \text{[Equation 1]}$$

Here, $V_{turn\ on}$ denotes a turn-on voltage of the tandem light-emitting element TD, $V_{turn\ on\ 1EL\ tandem}$ denotes a first sub turn-on voltage of the first light-emitting element, and Vint denotes the initialization voltage transferred to the pixel PX.

In an embodiment, the magnitude of the initialization voltage may be equal to or less than the magnitude of the turn-on voltage minus the first sub turn-on voltage or the second sub turn-on voltage. Because the first sub turn-on voltage and the second sub turn-on voltage may have the same magnitude, it may be understood that the magnitude of the initialization voltage is equal to or less than the magnitude of the turn-on voltage minus the first sub turn-on voltage.

In an embodiment, the magnitude of the initialization voltage may be equal to or greater than the magnitude of the first sub turn-on voltage or the second sub turn-on voltage. Because the first sub turn-on voltage and the second sub turn-on voltage may have the same magnitude, it may be understood that the magnitude of the initialization voltage is equal to or greater than the magnitude of the first sub turn-on voltage.

As described above, the magnitude of the initialization voltage may be equal to or less than the magnitude of the turn-on voltage. The closer the magnitude of the initialization voltage is to the magnitude of the turn-on voltage, the faster the initialization voltage may reach an emission voltage of the tandem light-emitting element TD. However, in the case where the initialization voltage is influenced by the threshold compensation voltage or the like, the initialization voltage may be equal to or greater than the turn-on voltage. To prevent this danger, a margin of a preset size needs to be provided between the initialization voltage and the turn-on voltage. Accordingly, the magnitude of the initialization voltage may be the magnitude of the turn-on voltage minus the first sub turn-on voltage or the second sub turn-on voltage, and the first sub turn-on voltage or the second sub turn-on voltage may mean the margin of the preset size.

Because the margin of the preset size is the first sub turn-on voltage or the second sub turn-on voltage, according to the pixel and the display apparatus including the pixel, a brightness change of the pixel PX due to a change in the initialization voltage caused by the threshold compensation voltage may be reduced.

In an embodiment, a voltage applied to the tandem light-emitting element TD may be a driving voltage. The driving voltage may have a magnitude of a turn-on voltage or more, and when the driving voltage is the turn-on voltage or more, the tandem light-emitting element TD may emit light or visibly rays.

In an embodiment, the threshold compensation voltage may be transferred to the driving thin-film transistor T1. The threshold compensation voltage is transferred to the driving thin-film transistor T1 through the compensation operation, and the magnitude of the threshold compensation voltage may be less than the magnitude of a first sub power voltage or the magnitude of a second sub power voltage.

As described above, because the magnitude of the threshold compensation voltage is less than the magnitude of the first sub power voltage or the magnitude of the second sub power voltage, a change in the magnitude of the initialization voltage due to a change in the magnitude of the threshold compensation voltage may also become less than the magnitude of the first sub power voltage or the magnitude of the second sub power voltage. When a change in the magnitude of the initialization voltage is less than the magnitude of the first sub power voltage or the magnitude of the second sub power voltage, a changed in the magnitude exceeding the margin of the preset size does not occur.

Figure 4:
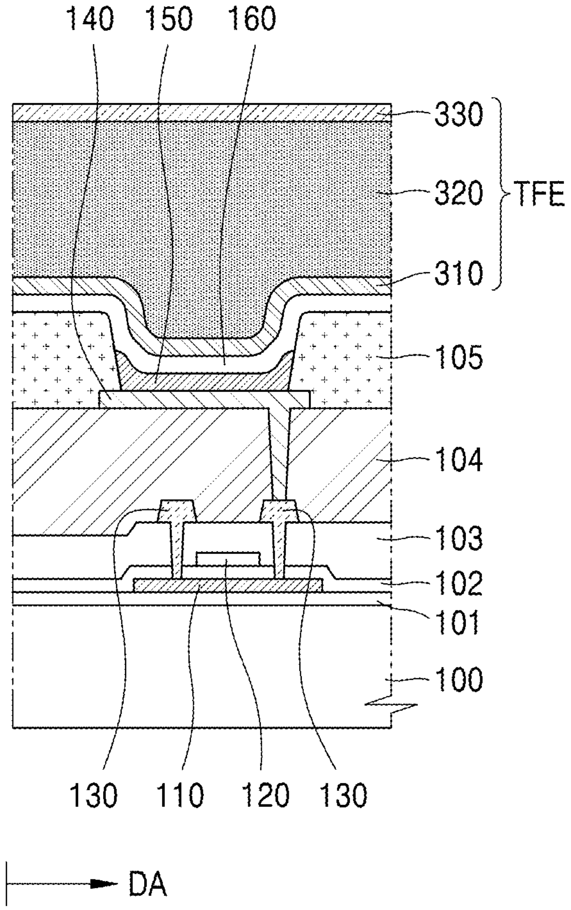
FIG. 4 is a schematic cross-sectional view of a portion of the display apparatus of FIG. 1.

FIG. 4 is a schematic cross-sectional view of a portion of the display apparatus 11 of FIG. 1.

As described above, the substrate 100 may include regions corresponding to the display area DA and the peripheral area PA outside the display area DA. The substrate 100 may include various flexible or bendable materials. In an embodiment, the substrate 100 may include glass, metal, or polymer resin. In addition, the substrate 100 may include polymer resin such as polyethersulphone, polyacrylate, polyetherimide, polyethylene naphthalate, polyethylene terephthalate, polyphenylene sulfide, polyarylate, polyimide, polycarbonate, or cellulose acetate propionate. The substrate 100 may have a multi-layered structure including two layers each including the polymer resin, and a barrier layer including an inorganic material (such as silicon oxide, silicon nitride, and silicon oxynitride) therebetween. However, various modifications may be made.

A buffer layer 101 may be disposed on the substrate 100. The buffer layer 101 may prevent impurity ions from diffusing, prevent penetration of moisture or external air, and serve as a barrier layer for planarizing a surface and/or a blocking layer. The buffer layer 101 may include silicon oxide, silicon nitride, or silicon oxynitride. In addition, the buffer layer 101 may allow a semiconductor layer 110 to be uniformly crystallized by adjusting a heat providing speed during a crystallization process for forming the semiconductor layer 110.

The semiconductor layer 110 may be disposed on the buffer layer 101. The semiconductor layer 110 may include polycrystalline silicon and include a channel region, a source region and a drain region. The channel region is not doped with impurities, and the source region and the drain region are on two opposite sides of the channel region and doped with impurities. Here, the impurities may change depending on the kind of a thin-film transistor. The impurities may be N-type impurities or P-type impurities. Although not shown in the drawing, the display apparatus in an embodiment may further include another semiconductor layer disposed in a different layer.

A gate insulating layer 102 may be disposed on the semiconductor layer 110. The gate insulating layer 102 may be a configuration for securing insulation between the semiconductor layer 110 and a gate layer 120. The gate insulating layer 102 may include an inorganic material such as silicon oxide, silicon nitride, and/or silicon oxynitride, and may be disposed between the semiconductor layer 110 and the gate layer 120. In addition, the gate insulating layer 102 may have a shape corresponding to the entirety of the surface of the substrate 100 and have a structure in which contact holes are formed in preset portions thereof. As described above, the insulating layer including the inorganic material may be formed by chemical vapor deposition ("CVD") or atomic layer deposition ("ALD"). This is also applicable to embodiments below and modifications thereof.

The gate layer 120 may be disposed on the gate insulating layer 102. The gate layer 120 may be disposed on a position vertically overlaps the semiconductor layer 110 and may include at least one of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), titanium (Ti), tungsten (W), and copper (Cu). The gate layer 120 is described below in detail. Although not shown in the drawing, the display apparatus in an embodiment may further include another gate layer disposed on another layer.

An inter-insulating layer 103 may be disposed on the gate layer 120. The inter-insulating layer 103 may cover the gate layer 120. The inter-insulating layer 103 may include an inorganic material. In an embodiment, the inter-insulating layer 103 may include a metal oxide or metal nitride, and the inorganic material may specifically include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$) or the like. In an embodiment, the inter-insulating layer 103 may include a double structure of $SiO_x/SiN_y$ or $SiN_x/SiO_y$.

A conductive layer 130 may be disposed on the inter-insulating layer 103. The conductive layer 130 may serve as an electrode connected to the source/drain regions of the semiconductor layer through a through hole included in the inter-insulating layer 103.

The conductive layer 130 may include at least one of aluminum (Al), platinum (Pt), palladium (Pd), silver (Ag), magnesium (Mg), gold (Au), nickel (Ni), neodymium (Nd), and iridium (Ir), chromium (Cr), lithium (Li), calcium (Ca), molybdenum (Mo), titanium (Ti), tungsten (W), and copper (Cu). In an embodiment, the conductive layer 130 may include a Ti layer, an Al layer, and/or a Cu layer. In an embodiment, the conductive layer 130 may include a structure of Ti/Al/Ti.

Although not shown in the drawing, the display apparatus in an embodiment may further include another conductive layer disposed on another layer. The another conductive layer may serve as a wiring layer serving as a wiring, for example. The another conductive layer may include the same material as that of the conductive layer 130 and have the same layer structure as that of the conductive layer 130.

An organic insulating layer 104 may be disposed on the conductive layer 130. The organic insulating layer 104 may cover the upper surface of the conductive layer 130 and may be an organic insulating layer having a generally flat upper surface to serve as a planarization layer. The organic insulating layer 104 may include an organic material such as acryl, benzocyclobutene ("BCB"), hexamethyldisiloxane ("HMDSO") or the like. The organic insulating layer 104 may include a single layer or a multi-layer. However, various modifications may be made.

Although not shown, the display apparatus in an embodiment may further include another organic insulating layer disposed on another layer. The another organic insulating layer may be disposed on the another conductive layer and may cover the upper surface of another conductive layer to serve as a planarization layer. The another organic insulating layer may include the same material as that of the organic insulating layer 104 and have the same layer structure as that of the organic insulating layer 104.

A pixel electrode 140 may be disposed on the organic insulating layer 104. In an alternative embodiment, the pixel electrode 140 may be disposed on the another organic insulating layer. However, for convenience of description, description is made on the assumption that the pixel electrode 140 is disposed on the organic insulating layer 104.

The pixel electrode 140 may be connected to the conductive layer 130 through a contact hole defined in the organic insulating layer 104. A display element may be disposed on the pixel electrode 140. As the display element, an organic light-emitting element (e.g., organic light-emitting diode "OLED") may be used. That is, the organic light-emitting element may be disposed on, e.g., the pixel electrode 140. The pixel electrode 140 may include a light-transmissive conductive layer and/or a reflective layer. The light-transmissive conductive layer includes a light-transmissive conductive oxide such as $In_2O_3$, indium zinc oxide ("IZO") or the like, and the reflective layer includes metal such as Al, Ag, the like. In an embodiment, the pixel electrode 140 may have a three-layered structure of indium tin oxide/silver/indium tin oxide ("ITO/Ag/ITO").

The pixel-defining layer 105 may be disposed on the organic insulating layer 104 and disposed to cover the edges of the pixel electrode 140. In an embodiment, the pixel-defining layer 105 may cover the edges of the pixel electrode 140. The pixel-defining layer 105 defines an opening corresponding to the pixel, and the opening may be defined to expose at least the central portion of the pixel electrode 140. The opening may be defined by the pixel-defining layer 105.

The pixel-defining layer 105 may include an organic material such as polyimide or hexamethyldisiloxane ("HMDSO"). In addition, a spacer may be disposed on the pixel-defining layer 105. Although it is shown that the spacer is disposed in the peripheral area PA, the spacer may be disposed in the display area DA. The spacer may prevent the organic light-emitting element from being damaged by sagging of a mask during a manufacturing process that uses the mask. The spacer may include an organic insulating material and include a single layer or a multi-layer.

An intermediate layer 150 and an opposite electrode 160 may be disposed in the opening. The intermediate layer 150 may include a low-molecular weight material or a polymer material. In the case where the intermediate layer 150 includes a low-molecular weight material, the intermediate layer 150 may include a hole injection layer, a hole transport layer, an emission layer, an electron transport layer, and/or an electron injection layer. In the case where the intermediate layer 150 includes a polymer material, the intermediate layer 150 may generally have a structure including a hole transport layer and an emission layer.

The structure of the intermediate layer 150 is not limited thereto and may have various structures. In an embodiment, the structure of the intermediate layer 150 may include a plurality of organic emission layers to be included in the structure of the tandem light-emitting element TD. Description thereof is described below.

In an embodiment, at least one of layers constituting the intermediate layer 150 may be unitary like the opposite electrode 160. In an embodiment, the intermediate layer 150 may include a layer patterned to correspond to each of a plurality of pixel electrodes 140.

The opposite electrode 160 may include a light-transmissive conductive layer including a light-transmissive conductive oxide such as ITO, $In_2O_3$, or IZO. The pixel electrode 140 is used as an anode, and the opposite electrode 160 is used as a cathode. The polarity of the electrode may be reversely applied.

The opposite electrode 160 may be disposed in the upper portion of the display area DA and disposed over the entirety of the surface of the display area DA. That is, the opposite electrode 160 may be unitary to cover the plurality of pixels. A thin-film encapsulation layer TFE may cover the display area DA entirely, and extend to the peripheral area PA to cover at least a portion of the peripheral area PA.

The thin-film encapsulation layer TFE may include a first inorganic encapsulation layer 310, a second inorganic encapsulation layer 330, and an organic encapsulation layer 320 therebetween. The first and second inorganic encapsulation layers 310 and 330 may include at least one inorganic material among aluminum oxide, titanium oxide, tantalum oxide, hafnium oxide, zinc oxide, silicon oxide, silicon nitride, silicon oxynitride, or the like. The first and second inorganic encapsulation layer 310 and 330 may include a single layer or a multi-layer including the above materials. The first inorganic encapsulation layer 310 and the second inorganic encapsulation layer 330 may include the same material or different materials from each other.

The thickness of the first inorganic encapsulation layer 310 may be different from that of the second inorganic encapsulation layer 330. The thickness of the first inorganic encapsulation layer 310 may be greater than that of the second inorganic encapsulation layer 330. In an alternative embodiment, the thickness of the second inorganic encapsulation layer 330 may be greater than that of the first inorganic encapsulation layer 310, or the thickness of the first inorganic encapsulation layer 310 may be the same as that of the second inorganic encapsulation layer 330.

The organic encapsulation layer 320 may include a monomer-based material and/or a polymer-based material. The polymer-based material may include an acryl-based resin, an epoxy-based resin, polyimide, and polyethylene. In an embodiment, the organic encapsulation layer 320 may include acrylate.

In another embodiment, the thin-film encapsulation layer TFE may be replaced by a cover member covering an entirety of the display area DA. The cover member may be disposed to not only cover the display area DA but also at least a portion of the peripheral area PA. The cover member may include a rigid member (e.g., glass or the like). Depending on the case, a transparent filler may be disposed between the cover member and the opposite electrode 160.

FIGS. 5 to 8 are schematic cross-sectional view of a structure of the tandem light-emitting element TD.

Figure 5:
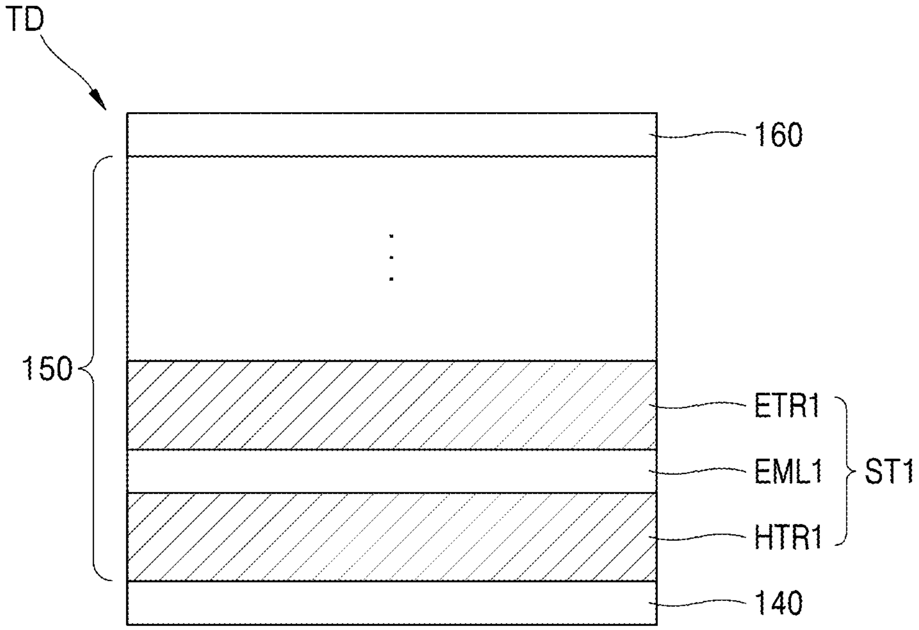
FIGS. 5 to 8 are schematic cross-sectional view of a structure of a tandem light-emitting element.

As shown in FIG. 5, the tandem light-emitting element TD may include the pixel electrode 140, a first stack ST1 disposed on the pixel electrode 140, and the opposite electrode 160 disposed on the first stack ST1. Although not shown in the drawing, the tandem light-emitting element TD may be provided on the substrate 100. Description thereof is replaced with the description for FIG. 4.

In an embodiment, in the case where the tandem light-emitting element TD is a front emission type, the pixel electrode 140 of the tandem light-emitting element TD may be a reflective electrode. The opposite electrode 160 of the tandem light-emitting element TD may be a transmissive or semi-transmissive electrode. Conversely, in the case where the tandem light-emitting element TD is a bottom emission type, the pixel electrode 140 may be understood as a cathode, and the opposite electrode 160 may be understood as an anode, and the characteristics of the pixel electrode 140 and the opposite electrode 160 may be understood to be different. Hereinafter, although the case where the tandem light-emitting element TD is a front emission type is mainly described, one of ordinary skill in the art would obviously derive the content of a tandem light-emitting element TD of a bottom emission type based on the description below.

The first stack ST1 may include a first hole transport region HTR1, a first emission layer EML1 disposed on the first hole transport region HTR1, and a first electron transport region ETR1 disposed on the first emission layer EML1.

The first hole transport region HTR1 may include at least one organic layer. The first hole transport region HTR1 may have a multi-layered structure including a plurality of layers respectively including a plurality of different materials, or have a single-layered structure including one organic layer.

In an embodiment, although the first hole transport region HTR1 may include a first hole injection layer and a first hole transport layer, the disclosure is not limited thereto. Depending on the case, one of the first hole injection layer and the first hole transport layer may be omitted.

The first electron transport region ETR1 may include at least one organic layer. The first electron transport region ETR1 may have a multi-layered structure including a plurality of layers respectively including a plurality of different materials, or have a single-layered structure including one organic layer.

In an embodiment, although the first electron transport region ETR1 may include a first electron injection layer and a first electron transport layer, the disclosure is not limited thereto, and one of the first electron injection layer and the first electron transport layer may be omitted.

The first emission layer EML1 may include a low-molecular weight organic material or a polymer organic material as an emission material. The first emission layer EML1 may include a host material and a dopant material. The first emission layer EML1 may include a phosphorescent or fluorescent material as a dopant in a host material. The first emission layer EML1 may include thermally activated delayered fluorescence ("TADF") dopant in a host material. In an alternative embodiment, the first emission layer EML1 may include quantum dots as an emission material. A core of the quantum dot may be one of a Group II-Group VI compound, a Group III-Group V compound, a Group IV-Group VI compound, a Group IV element, a Group IV compound, or any combinations thereof.

As the host material of the first emission layer EML1, known materials such as pyrene derivatives, perylene derivatives, and anthracene derivatives may be used. As the dopant material of the first emission layer EML1, known materials such as styryl derivatives, perylene, and their derivatives may be used.

Figure 6:
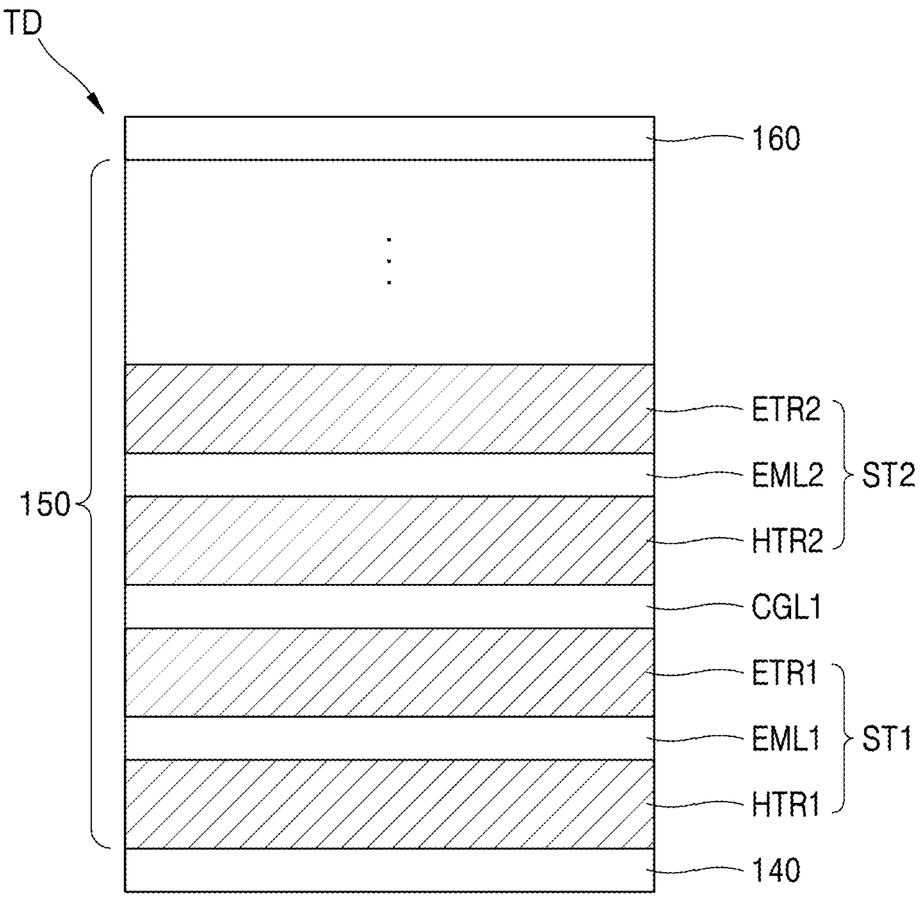

In addition, although not shown in FIG. 5, another stack structure may be further disposed on the first stack ST1, and an example thereof is shown in FIG. 6.

As shown in FIG. 6, the second stack ST2 may be disposed on the first stack ST1. Because a basic structure of the second stack ST2 is the same as the first stack ST1, repeated description is omitted and only differences are described.

The second stack ST2 may include a second hole transport region HTR2, a second emission layer EML2 disposed on the second hole transport region HTR2, and a second electron transport region ETR2 disposed on the second emission layer EML2.

The second emission layer EML2 included in the second stack ST2 may generate a visible ray having a wavelength in a range equal or similar to a range of the wavelength of a visible ray emitted from the first emission layer EML1. Conversely, the second emission layer EML2 may generate a visible ray having a wavelength different from the wavelength of the visibly ray emitted from the first emission layer EML1. The characteristics of the second emission layer EML2 may change depending on the characteristics of the display apparatus 11 to be implemented.

A first charge generation layer CGL1 may be disposed between the first stack ST1 and the second stack ST2. When a voltage is applied, the first charge generation layer CGL1 may generate charges (electrons and holes) by forming a complex through an oxidation-reduction reaction. The first charge generation layer CGL1 may provide generated charges to adjacent stacks ST1 and ST2.

The first charge generation layer CGL1 may double a current efficiency generated in one stack ST1 or ST2 and adjust a balance of the charges between the first stack ST1 and the second stack ST2.

In an embodiment, the first electron transport region ETR1 of the first stack ST1 may transport electrons generated from the first charge generation layer CGL1 to the first emission layer EML1. The second hole transport region HTR2 of the second stack ST2 may transport holes generated from the first charge generation layer CGL1 to the second emission layer EML2.

In an embodiment, the first charge generation layer CGL1 may have a multi-layered structure including a plurality of sub-charge generation layers (not shown). Depending on the case, a charge buffer layer (not shown) may be further included between the plurality of sub-charge generation layers (not shown).

Figure 7:
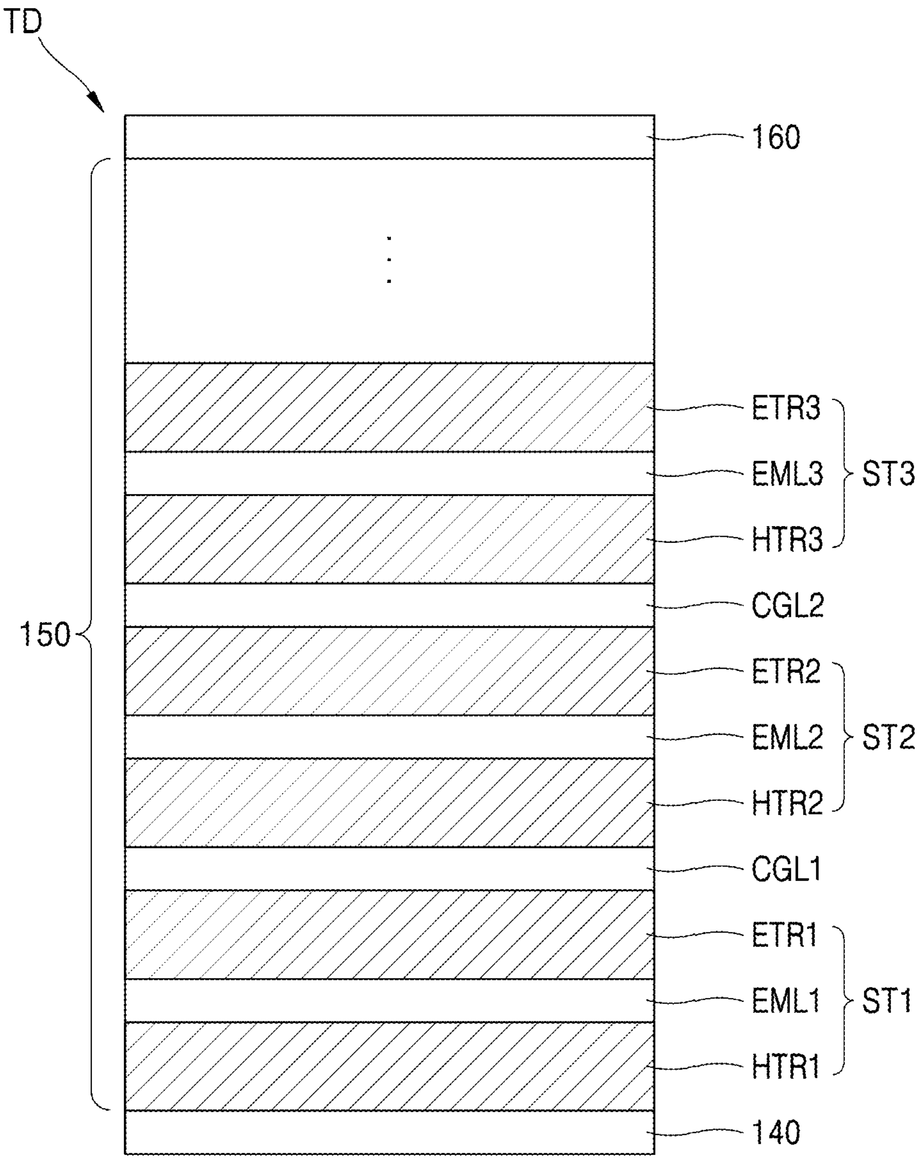

In addition, although not shown in FIG. 6, another stack structure may be further disposed on the second stack ST2, and an example thereof is shown in FIG. 7.

As shown in FIG. 7, a third stack ST3 may be disposed on the second stack ST2. Because the basic structure of the third stack ST3 is the same as the structure of the first stack ST1 and the second stack ST2 described above, repeated descriptions are omitted and only differences are described.

The third stack ST3 may include a third hole transport region HTR3, a third emission layer EML3 disposed on the third hole transport region HTR3, and a third electron transport region ETR3 disposed on the third emission layer EML3.

The third emission layer EML3 included in the third stack ST3 may generate a visible ray having a wavelength in a range equal or similar to a range of the wavelength of a visible ray emitted from the second emission layer EML2. Conversely, the third emission layer EML3 may generate a visible ray having a wavelength different from the wavelength of the visibly ray emitted from the second emission layer EML2. The characteristics of the third emission layer EML3 may change depending on the characteristics of the display apparatus 11 to be implemented.

A second charge generation layer CGL2 may be disposed between the second stack ST2 and the third stack ST3. When a voltage is applied, the second charge generation layer CGL2 may generate charges (electrons and holes) by forming a complex through an oxidation-reduction reaction. The second charge generation layer CGL2 may provide generated charges to adjacent stacks ST2 and ST3. Description of the second charge generation layer CGL2 is replaced by the description of the first charge generation layer CGL1.

Figure 8:
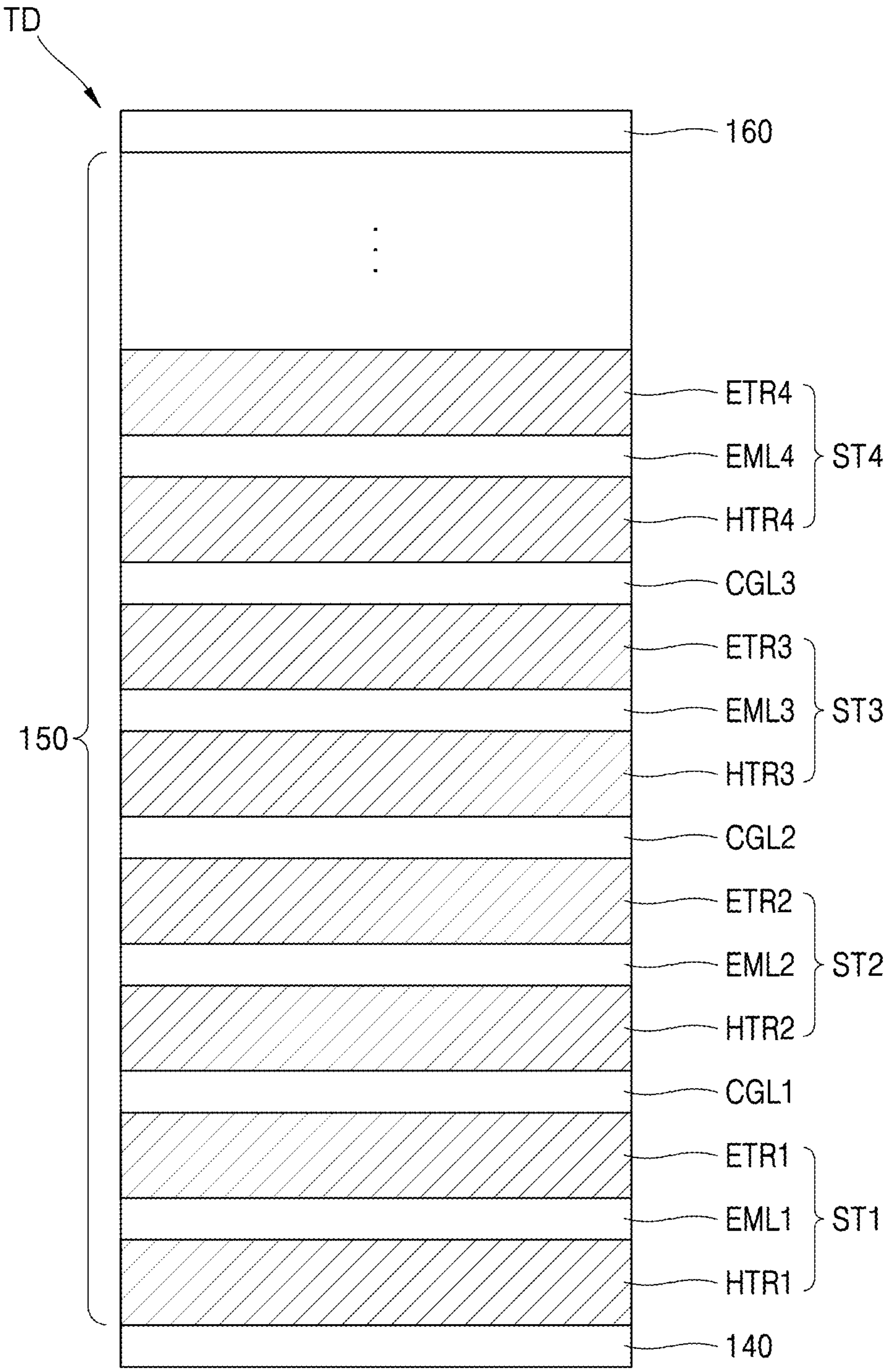

In addition, although not shown in FIG. 7, another stack structure may be further disposed on the third stack ST3, and an example thereof is shown in FIG. 8.

As shown in FIG. 8, a fourth stack ST4 may be disposed on the third stack ST3. Because the basic structure of the fourth stack ST4 is the same as the structure of the first stack ST1 to the third stack ST3 described above, repeated descriptions are omitted and only differences are described.

The fourth stack ST4 may include a fourth hole transport region HTR4, a fourth emission layer EML4 disposed on the fourth hole transport region HTR4, and a fourth electron transport region ETR4 disposed on the fourth emission layer EML4.

The fourth emission layer EMLA included in the fourth stack ST4 may generate a visible ray having a wavelength in a range equal or similar to a range of the wavelength of a visible ray emitted from the third emission layer EML3. Conversely, the fourth emission layer EML4 may generate a visible ray having a wavelength different from the wavelength of the visibly ray emitted from the third emission layer EML3. The characteristics of the fourth emission layer EML4 may change depending on the characteristics of the display apparatus 11 to be implemented.

A third charge generation layer CGL3 may be disposed between the third stack ST3 and the fourth stack ST4. When a voltage is applied, the third charge generation layer CGL3 may generate charges (electrons and holes) by forming a complex through an oxidation-reduction reaction. The third charge generation layer CGL3 may provide generated charges to adjacent stacks ST3 and ST4. Description of the third charge generation layer CGL3 is replaced by the description of the first charge generation layer CGL1.

In addition, although not shown in FIG. 8, another stack structure may be further disposed on the fourth stack ST4.

The hole transport regions and the charge transport regions may be formed using the general methods known in the art. In an embodiment, the hole transport regions and the charge transport regions may be formed using various methods such as vacuum deposition, spin coating, a cast method, a Langmuir-Blodgett method, inkjet printing, laser printing, laser induced thermal imaging ("LITI"), or the like.

The hole transport regions may further include a charge generation material to improve conductivity in addition to the above-mentioned materials. The charge generation material may be uniformly or non-uniformly dispersed in each of the hole transport regions. The charge generation material may be, e.g., p-dopant. The p-dopant may be one of a quinone derivative, a metal oxide, and a cyano group-containing compound, but is not limited thereto.

Figure 9:
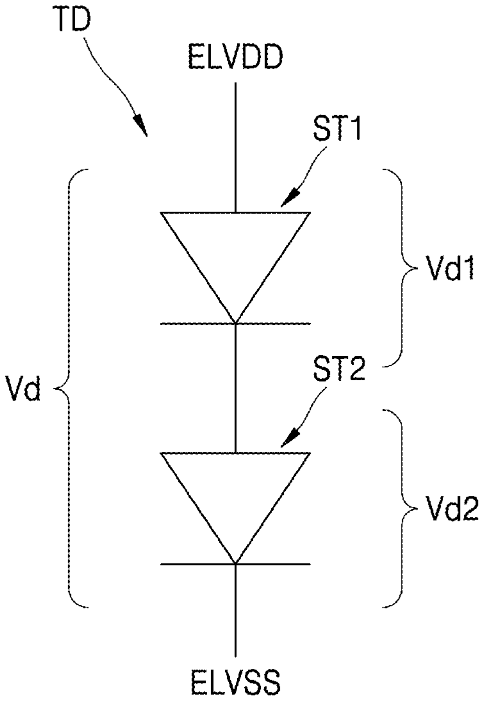
FIGS. 9 to 11 are schematic circuit diagrams of an embodiment of a tandem light-emitting element.
Figure 10:
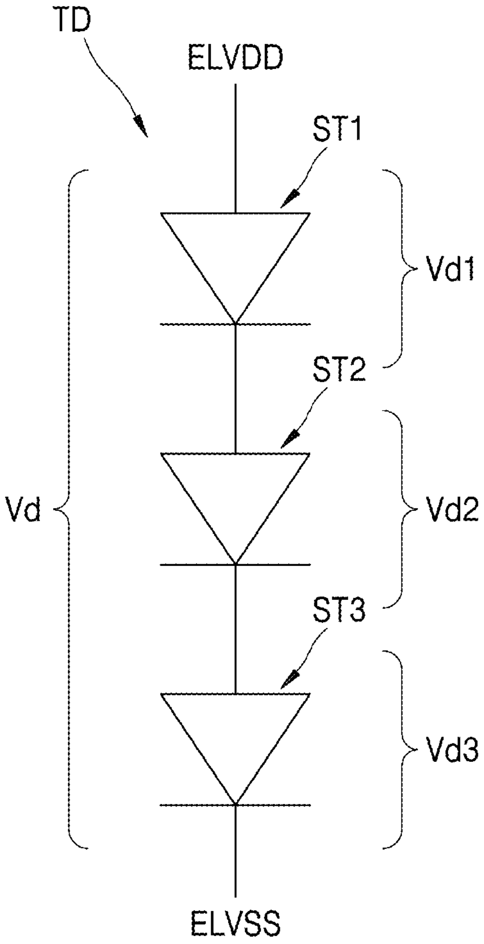
Figure 11:
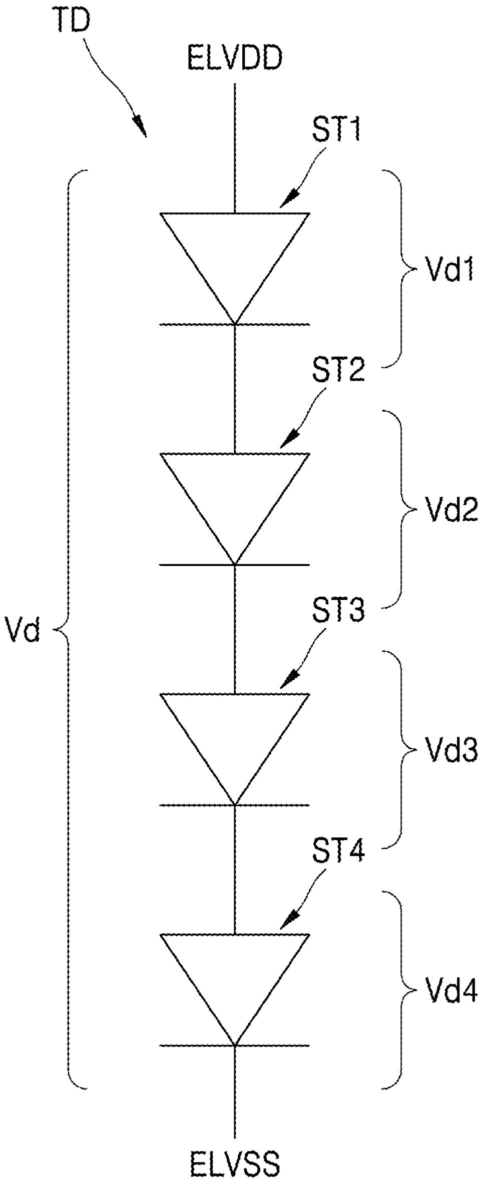

FIGS. 9 to 11 are schematic circuit diagrams of an embodiment of the tandem light-emitting element TD.

The circuit diagrams shown in FIGS. 9 to 11 correspond to schematic cross-sectional views of the tandem light-emitting element shown in FIGS. 6 to 8.

As shown in FIG. 9, a voltage applied to the entirety of the tandem light-emitting element TD is a driving voltage Vd, and the tandem light-emitting element TD may include light-emitting elements electrically connected in series. In an embodiment, the tandem light-emitting element TD may include a first light-emitting element and a second light-emitting element electrically connected in series. The first light-emitting element may be the first stack ST1, and the second light-emitting element may be the second stack ST2.

The driving voltage Vd may be a difference between the first power voltage ELVDD and the second power voltage ELVSS. When the driving voltage Vd is a turn-on voltage or more, the tandem light-emitting element TD may emit light. The turn-on voltage may denote a threshold voltage for the tandem light-emitting element TD to generate light or a visible ray.

A voltage applied to the first light-emitting element may be a first sub-driving voltage Vd1, and a voltage applied to the second light-emitting element may be a second sub-driving voltage Vd2. When a voltage of a first sub turn-on voltage or more is supplied to the first light-emitting element, the first light-emitting element may emit light. When a voltage of a second sub turn-on voltage or more is supplied to the second light-emitting element, the second light-emitting element may emit light.

In an embodiment, when the first sub-driving voltage Vd1 is the first sub turn-on voltage or more, the first light-emitting element may emit light or a visible ray. In an embodiment, when the second sub-driving voltage Vd2 is the second sub turn-on voltage or more, the second light-emitting element may emit light or a visible ray. In an embodiment, the magnitude of the driving voltage Vd may be equal to the magnitude of a sum of the first sub-driving voltage Vd1 and the second sub-driving voltage Vd2.

As shown in FIG. 10, the tandem light-emitting element TD may include the first light-emitting element, the second light-emitting element, and a third light-emitting element electrically connected in series. The first light-emitting element may be the first stack ST1, the second light-emitting element may be the second stack ST2, and the third light-emitting element may be the third stack ST3.

A voltage applied to the first light-emitting element may be the first sub-driving voltage Vd1, a voltage applied to the second light-emitting element may be the second sub-driving voltage Vd2, and a voltage applied to the third light-emitting element may be a third sub-driving voltage Vd3. When a voltage of a first sub turn-on voltage or more is supplied to the first light-emitting element, the first light-emitting element may emit light. When a voltage of a second sub turn-on voltage or more is supplied to the second light-emitting element, the second light-emitting element may emit light. When a voltage of a third sub turn-on voltage or more is supplied to the third light-emitting element, the third light-emitting element may emit light.

In an embodiment, the first sub-driving voltage Vd1 is the first sub turn-on voltage or more, the first light-emitting element may emit light or a visible ray. In an embodiment, the second sub-driving voltage Vd2 is the second sub turn-on voltage or more, the second light-emitting element may emit light or a visible ray. In an embodiment, the third sub-driving voltage Vd3 is the third sub turn-on voltage or more, the third light-emitting element may emit light or a visible ray. In an embodiment, the magnitude of the driving voltage Vd may be equal to the magnitude of a sum of the first sub-driving voltage Vd1, the second sub-driving voltage Vd2, and the third sub-driving voltage Vd3.

As shown in FIG. 11, the tandem light-emitting element TD may include the first light-emitting element, the second light-emitting element, the third light-emitting element, and a fourth light-emitting element electrically connected in series. The first light-emitting element may be the first stack ST1, the second light-emitting element may be the second stack ST2, the third light-emitting element may be the third stack ST3, and the fourth light-emitting element may be the fourth stack ST4.

A voltage applied to the first light-emitting element may be the first sub-driving voltage Vd1, a voltage applied to the second light-emitting element may be the second sub-driving voltage Vd2, a voltage applied to the third light-emitting element may be the third sub-driving voltage Vd3, and a voltage applied to the fourth light-emitting element may be a fourth sub-driving voltage Vd4. When a voltage of a first sub turn-on voltage or more is supplied to the first light-emitting element, the first light-emitting element may emit light. When a voltage of a second sub turn-on voltage or more is supplied to the second light-emitting element, the second light-emitting element may emit light. When a voltage of a third sub turn-on voltage or more is supplied to the third light-emitting element, the third light-emitting element may emit light. When a voltage of the fourth sub turn-on voltage or more is supplied to the fourth light-emitting element, the fourth light-emitting element may emit light.

In an embodiment, the first sub-driving voltage Vd1 is the first sub turn-on voltage or more, the first light-emitting element may emit light or a visible ray. In an embodiment, the second sub-driving voltage Vd2 is the second sub turn-on voltage or more, the second light-emitting element may emit light or a visible ray. In an embodiment, the third sub-driving voltage Vd3 is the third sub turn-on voltage or more, the third light-emitting element may emit light or a visible ray. In an embodiment, the fourth sub-driving voltage Vd4 is the fourth sub turn-on voltage or more, the fourth light-emitting element may emit light or a visible ray. In an embodiment, the magnitude of the driving voltage Vd may be equal to the magnitude of a sum of the first sub-driving voltage Vd1, the second sub-driving voltage Vd2, the third sub-driving voltage Vd3, and the fourth sub-driving voltage Vd4.

Figure 12:
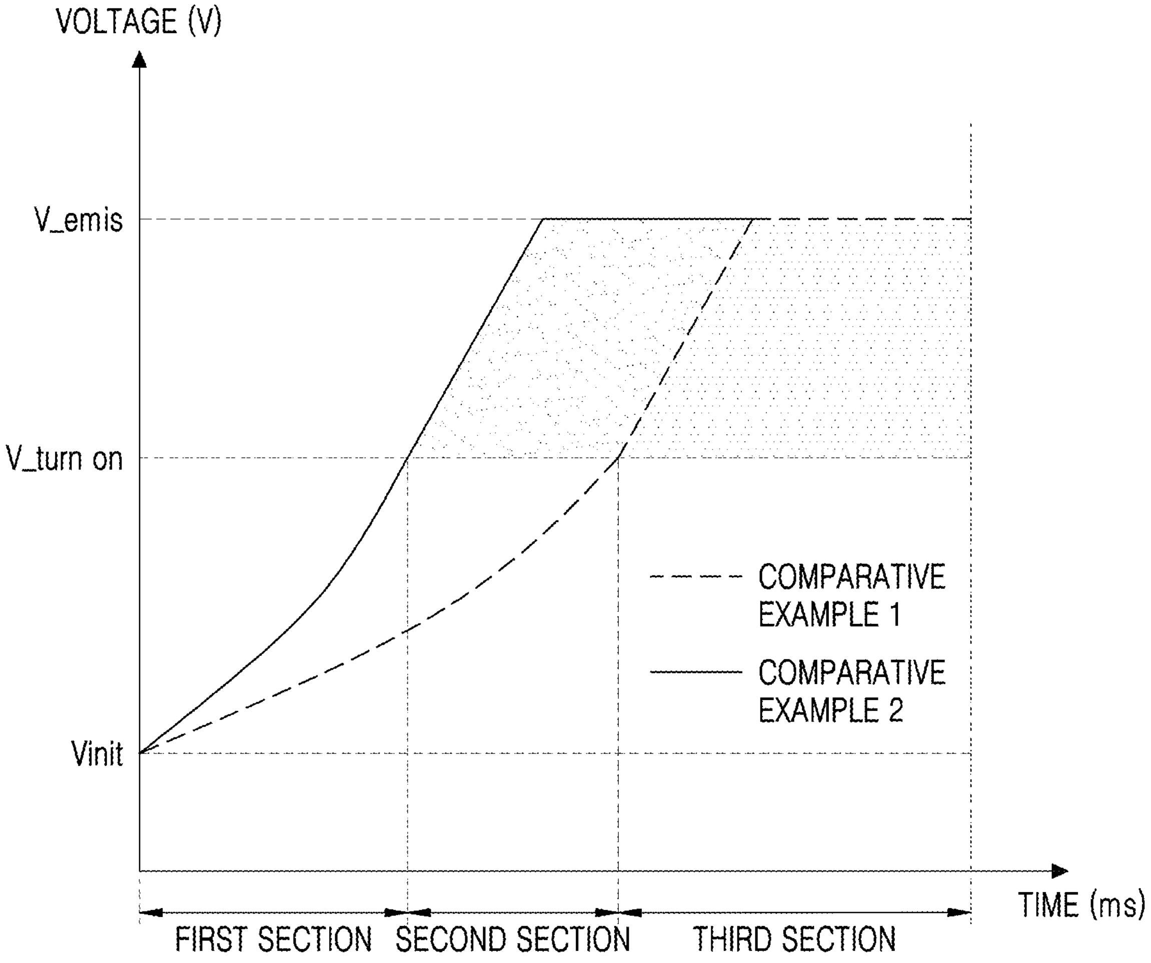
FIG. 12 is a brightness graph of comparative examples.

FIG. 12 is a brightness graph of comparative examples.

As shown in FIG. 12, brightness according to Comparative example 1 and Comparative example 2 are known. An x axis in the graph of FIG. 12 represents time and may denote an emission time corresponding to one frame. A y axis in the graph of FIG. 12 represents a voltage and may denote a driving voltage applied to the tandem light-emitting element to implement one frame. In the graph of FIG. 12, the colored area may denote brightness.

A first section may denote a section in which the driving voltage rises from the initialization voltage to a turn-on voltage V_turn_on. The first section is a section in which a driving voltage applied to the tandem light-emitting element TD is less than the turn-on voltage V_turn_on and may be a section during which the tandem light-emitting element TD does not emit light.

A second section may denote a section in which a driving voltage of Comparative example 2 is equal to or greater than the turn-on voltage V_turn_on, and may be a section during which the tandem light-emitting element TD emits light because a driving voltage applied to the tandem light-emitting element TD is equal to or greater than the turn-on voltage V_turn_on. During the second section, the driving voltage of Comparative example 2 may rise up to an emission voltage V_emis.

A third section may denote a section in which a driving voltage of Comparative example 1 is equal to or greater than the turn-on voltage V_turn_on, and may be a section during which the tandem light-emitting element TD emits light because a driving voltage applied to the tandem light-emitting element TD is equal to or greater than the turn-on voltage V_turn_on. During the third section, the driving voltage of Comparative example 1 may rise up to an emission voltage V_emis.

Comparative example 1 is an example (reference) of a state in which a lateral leakage does not occur, and Comparative example 2 is an example of a state in which a lateral leakage occurs. Examination of Comparative example 1 and Comparative example 2 shows that the driving voltage of Comparative example 2 relatively rapidly reaches a turn-on voltage due to the lateral leakage. Because the driving voltage of Comparative example 2 more rapidly reaches the turn-on voltage than the driving voltage of Comparative example 1, it is confirmed that the brightness (the area in the graph) of the tandem light-emitting element in Comparative example 2 is greater than the brightness of the tandem light-emitting element in Comparative example 1. This phenomenon is an overshoot phenomenon and is problematic in that a brightness brighter than actually intended brightness occurs.

Figure 13:
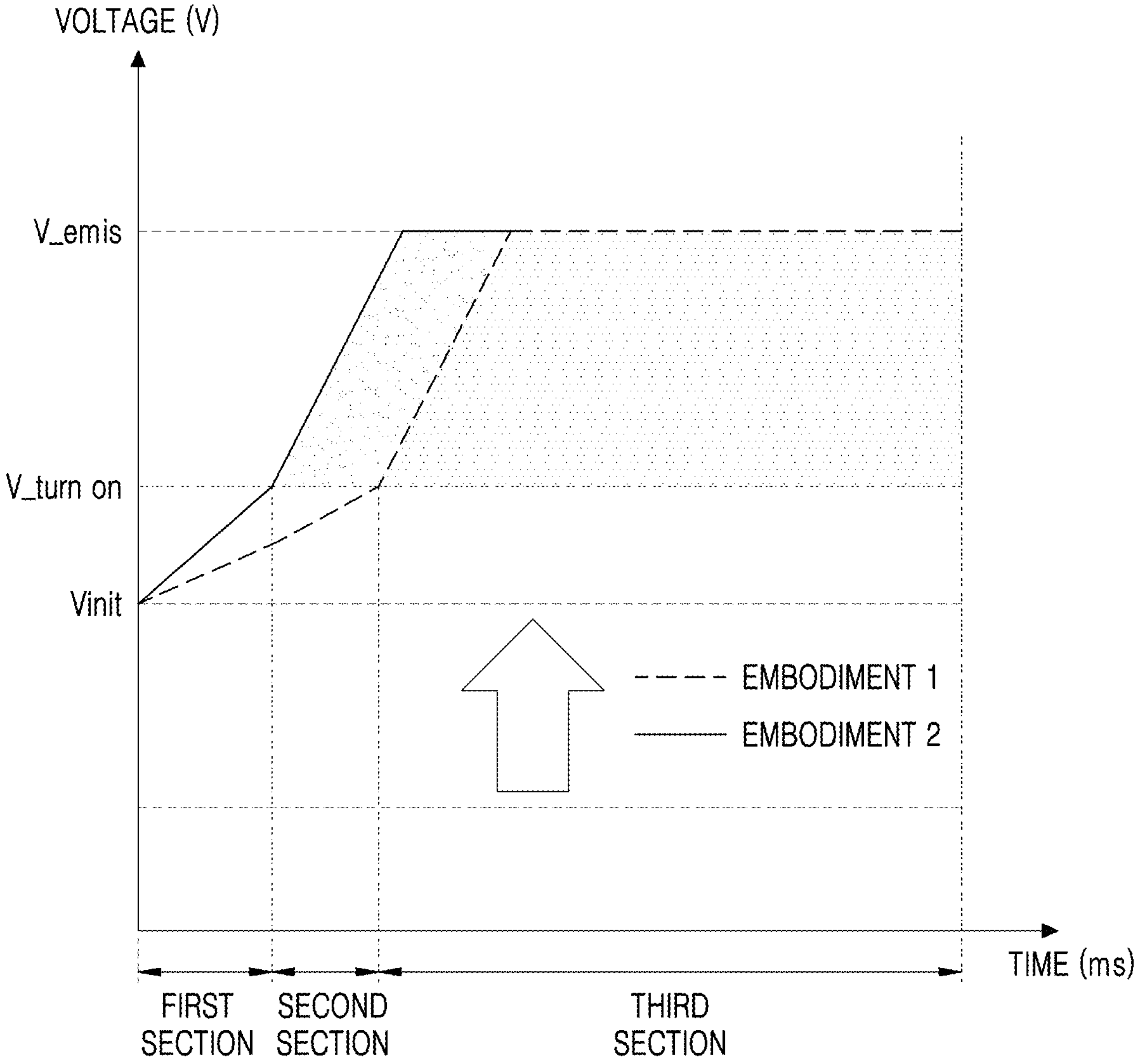
FIG. 13 is a brightness graph of embodiments.

FIG. 13 is a brightness graph of embodiments.

As shown in FIG. 13, brightness according to Embodiment 1 and Embodiment 2 are known.

An x axis in the graph of FIG. 13 represents time and may denote an emission time corresponding to one frame. A y axis in the graph of FIG. 13 represents a voltage and may denote a driving voltage applied to the tandem light-emitting element to implement one frame. In the graph of FIG. 13, the colored area may denote brightness.

A first' section may denote a section in which the driving voltage rises from the initialization voltage to a turn-on voltage V_turn_on. The first' section is a section in which a driving voltage applied to the tandem light-emitting element TD is less than the turn-on voltage V_turn_on and may be a section during which the tandem light-emitting element TD does not emit light.

A second' section may denote a section in which a driving voltage of Embodiment 2 is equal to or greater than the turn-on voltage V_turn_on, and may be a section during which the tandem light-emitting element TD emits light because a driving voltage applied to the tandem light-emitting element TD is equal to or greater than the turn-on voltage V_turn_on. During the second section, the driving voltage of Embodiment 2 may rise up to an emission voltage V_emis.

A third' section may denote a section in which a driving voltage of Embodiment 1 is equal to or greater than the turn-on voltage V_turn_on, and may be a section during which the tandem light-emitting element TD emits light because a driving voltage applied to the tandem light-emitting element TD is equal to or greater than the turn-on voltage V_turn_on. During the third' section, the driving voltage of Embodiment 2 may rise up to an emission voltage V_emis.

Embodiment 1 is an embodiment (reference) of a state in which a lateral leakage does not occur, and Embodiment 2 is an embodiment of a state in which a lateral leakage occurs. Embodiments 1 and 2 are examples in which the initialization voltage is increased compared to Comparative examples 1 and 2. The initialization voltage of Embodiments 1 and 2 is greater than the initialization voltage of Comparative examples 1 and 2.

Examination of Embodiments 1 and 2 shows that the driving voltage of Embodiment 2 relatively rapidly reaches the turn-on voltage due to the lateral leakage, but as the initialization voltage is increased, a brightness difference between Embodiments 1 and 2 is small.

Accordingly, as in Embodiments 1 and 2, when the initialization voltage is increased, even though a lateral leakage occurs, a brightness difference is small, and this is more significant when compared to Comparative examples.

Figure 14:
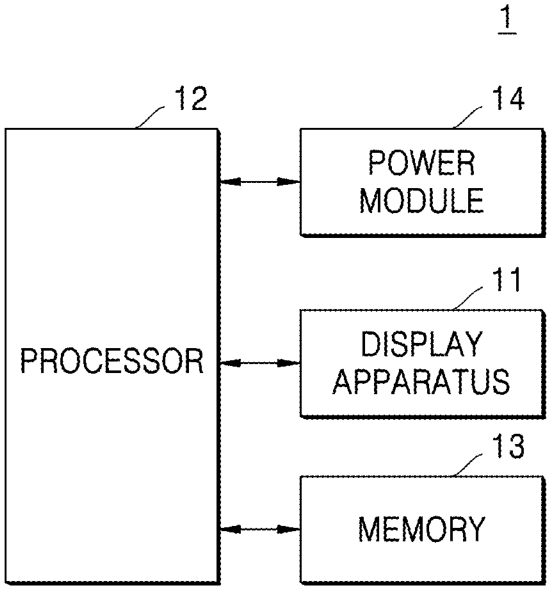
FIG. 14 is a block diagram of an electronic apparatus.

FIG. 14 is a block diagram of an electronic device.

Referring to FIG. 14, the electronic apparatus 1 may comprise the display apparatus 11, a processor 12, a memory 13, and a power module 14. The display apparatus 11 may comprise the display part 10 above mentioned.

The processor 12 may comprise at least one of a central processing unit (CPU), an application processor (AP), a graphic processing unit (GPU), a communication processor (CP), an image signal processor (ISP), and a controller.

Data for operations of the processor 12 or the display apparatus 11 may be stored in the memory 13. When the processor 12 executes an application stored in the memory 13, image data signals and/or input control signals may be transferred to the display apparatus 11, and the display apparatus 11 may process the received signals to output image information through a display screen.

The power module 14 may comprise a power supply module such as a power adapter or a battery device, and a power conversion module that converts power supplied by the power supply module to generate power necessary for operation of the electronic apparatus 1.

At least one of the components of the display apparatus 11 described above may be comprised in the electronic apparatus 1 to the embodiments described above. Additionally, some individual modules functionally comprised in one module may be comprised in the display apparatus while others may be provided separately from the display apparatus.

The display apparatus 11 of FIG. 14 may comprise one of the examples of the display part 10 described in FIGS. 1 to 13. For convenience of description, other descriptions are omitted, but one of ordinary skill in the art can easily and clearly understand the display apparatus 11 of FIG. 14 comprising display part 10 based on the descriptions of FIGS. 1 to 13.

In an embodiment, the electronic apparatus 1 may comprise the memory 13 which stores data information, the processor 12 which generates data signals and/or control signals based on the data information, and the display apparatus 11 that operates based on the data signals and/or control signals.

Figure 15:
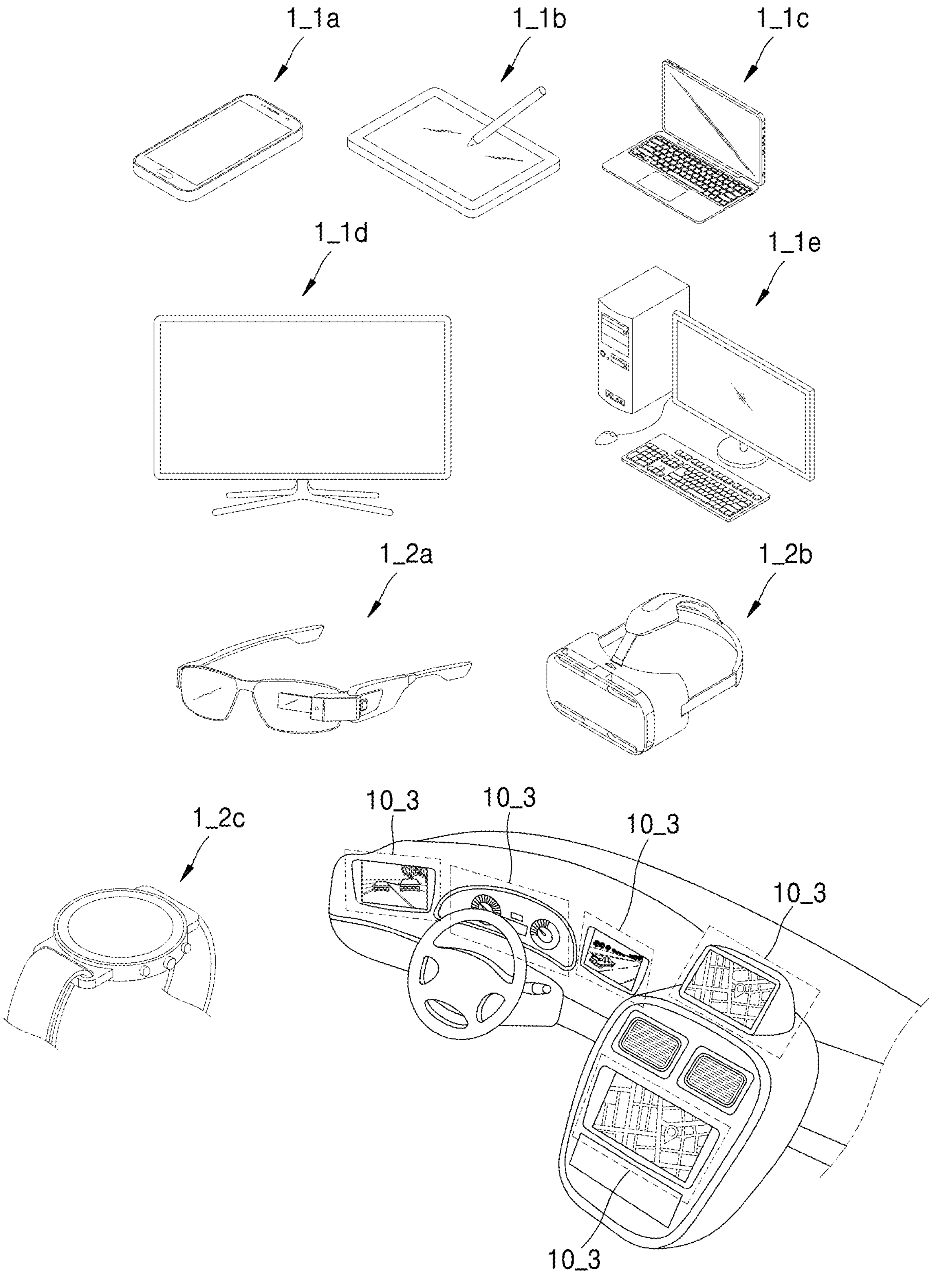
FIG. 15 shows schematic views of various electronic apparatuses.

FIG. 15 shows schematic views of various electronic apparatuses.

Referring to FIG. 15, the electronic apparatus 1 may comprise not only electronic devices for displaying image such as smartphone 1_1*a*, tablet PC 1_1*b*, laptop 1_1*c*, TV 1_1*d*, and desktop monitor 1_1*e*, but also wearable electronic devices comprising display modules such as smart glass 1_2*a*, head-mounted display 1_2*b*, and smart watch 1_2*c*, as well as vehicle electronic device 10_3 comprising display module such as instrument panel, center fascia, dashboard equipped with Center Information Display, and rearview mirror display of automobile. In an embodiment, a pixel with a reduced change in brightness of a light-emitting element caused by a current leakage phenomenon, and a display apparatus including the pixel may be implemented. However, the scope of the disclosure is not limited by this effect.

It should be understood that embodiments described herein should be considered in a descriptive sense only and not for purposes of limitation. Descriptions of features or advantages within each embodiment should typically be considered as available for other similar features or advantages in other embodiments. While embodiments have been described with reference to the drawing figures, it will be understood by those of ordinary skill in the art that various changes in form and details may be made therein without departing from the spirit and scope as defined by the following claims.

What is claimed is:

1. A pixel comprising:

a tandem light-emitting element including a first light-emitting element and a second light-emitting element which are connected in series;

a driving thin-film transistor electrically connected to the tandem light-emitting element;

a storage capacitor electrically connected to a gate electrode of the driving thin-film transistor and the tandem light-emitting element; and an initialization thin-film transistor electrically connected to an electrode of the storage capacitor, wherein the tandem light-emitting element emits light when a voltage equal to a turn-on voltage or more is supplied to the tandem light-emitting element, an initialization voltage is applied to the electrode of the storage capacitor, the first light-emitting element emits light when a voltage equal to a first sub turn-on voltage or more is applied to the first light-emitting element, and the second light-emitting element emits light when a voltage equal to a second sub turn-on voltage or more is applied to the second light-emitting element, and a magnitude of the initialization voltage is less than or equal to a magnitude obtained by subtracting the first sub turn-on voltage or the second sub turn-on voltage from the turn-on voltage, wherein the magnitude of the initialization voltage is greater than or equal to a magnitude of the first sub turn-on voltage or a magnitude of the second sub turn-on voltage.

2. The pixel of claim 1, wherein a magnitude of the first sub turn-on voltage is equal to a magnitude of the second sub turn-on voltage.

3. The pixel of claim 1, wherein a driving voltage equal to the turn-on voltage or more is applied to the tandem light-emitting element.

4. The pixel of claim 1, wherein a threshold compensation voltage is transferred to the driving thin-film transistor through a compensation operation.

5. The pixel of claim 4, wherein a magnitude of the threshold compensation voltage is less than a magnitude of a first sub power voltage or a magnitude of a second sub power voltage.

6. The pixel of claim 1, wherein the tandem light-emitting element further includes a third light-emitting element connected in series to the second light-emitting element, and the third light-emitting element emits light when a third sub turn-on voltage is supplied to the third light-emitting element.

7. The pixel of claim 6, wherein magnitudes of the first sub turn-on voltage, the second sub turn-on voltage, and the third sub turn-on voltage are equal to each other.

8. The pixel of claim 6, wherein the tandem light-emitting element further includes a fourth light-emitting element connected in series to the third light-emitting element, and the fourth light-emitting element emits light when a fourth sub turn-on voltage is supplied to the fourth light-emitting element.

9. A pixel comprising:

a tandem light-emitting element including a first light-emitting element and a second light-emitting element which are connected in series;

a driving thin-film transistor electrically connected to the tandem light- emitting element and having a threshold voltage;

a storage capacitor electrically connected to a gate electrode of the driving thin-film transistor and the tandem light-emitting element; and an initialization thin-film transistor electrically connected to an electrode of the storage capacitor, an initialization voltage being applied to the electrode of the storage capacitor, wherein the tandem light-emitting element emits light when a voltage equal to a turn-on voltage or more is supplied to the tandem light-emitting element, a threshold compensation voltage which compensates for the threshold voltage is transferred to the driving thin-film transistor through a compensation operation, the first light-emitting element emits light when a voltage equal to a first sub turn-on voltage or more is applied to the first light-emitting element, and the second light-emitting element emits light when a voltage equal to a second sub turn-on voltage or more is applied to the second light-emitting element, a magnitude of the initialization voltage is less than or equal to a magnitude of the turn-on voltage, and the magnitude of the initialization voltage is equal to or greater than a magnitude of the first sub turn-on voltage.

10. The pixel of claim 9, wherein a magnitude of the threshold compensation voltage is less than a magnitude of a first sub power voltage.

11. The pixel of claim 9, wherein a magnitude of the first sub turn-on voltage is equal to a magnitude of the second sub turn-on voltage.

12. The pixel of claim 9, wherein a driving voltage equal to the turn-on voltage or more is applied to the tandem light-emitting element.

13. The pixel of claim 9, wherein the tandem light-emitting element further includes a third light-emitting element connected in series to the second light-emitting element, and the third light-emitting element emits light when a third sub turn-on voltage is supplied to the third light-emitting element.

14. The pixel of claim 13, wherein magnitudes of the first sub turn-on voltage, the second sub turn-on voltage, and the third sub turn-on voltage are equal to each other.

15. The pixel of claim 13, wherein the tandem light-emitting element further includes a fourth light-emitting element connected in series to the third light-emitting element, and the fourth light-emitting element emits light when a fourth sub turn-on voltage is supplied to the fourth light-emitting element, and magnitudes of the first sub turn-on voltage, the second sub turn-on voltage, the third sub turn-on voltage, and the fourth sub turn-on voltage are equal to each other.

16. An electronic apparatus comprising:

a memory which stores data information;

a processor which generates data signals and/or control signals based on the data information; and a display apparatus which operates based on the data signals and/or the control signals, wherein the display apparatus comprising:

a display part in which a pixel connected to a data line and a gate line is disposed, the pixel including:

a tandem light-emitting element including:

a first light-emitting element and a second light-emitting element which are connected in series;

a driving thin-film transistor electrically connected to the tandem light-emitting element;

a storage capacitor electrically connected to a gate electrode of the driving thin-film transistor and the tandem light-emitting element; and an initialization thin-film transistor electrically connected to an electrode of the storage capacitor, the initialization voltage being applied to the electrode of the storage capacitor;

a data driver which provides a data voltage to the pixel through the data line;

a power supply part which provides a power voltage and an initialization voltage; and a controller which controls the data driver and the power supply part in response to control signals, wherein the tandem light-emitting element emit lights when a voltage equal to a turn-on voltage or more is supplied to the tandem light-emitting element, and wherein the first light-emitting element emits light when a voltage equal to a first sub turn-on voltage or more is applied to the first light-emitting element, and the second light-emitting element emits light when a voltage equal to a second sub turn-on voltage or more is applied to the second light-emitting element, a magnitude of the initialization voltage is less than or equal to a magnitude obtained by subtracting the first sub turn-on voltage from the turn-on voltage, and the magnitude of the initialization voltage is equal to or greater than a magnitude of the first sub turn-on voltage.

17. The electronic apparatus of claim 16, wherein a threshold compensation voltage which compensates for a threshold voltage of the driving thin-film transistor is transferred through a compensation operation, and a magnitude of the threshold compensation voltage is less than a magnitude.

* * * * *